US010803541B2

(12) United States Patent
Napoli

(10) Patent No.: US 10,803,541 B2
(45) Date of Patent: Oct. 13, 2020

(54) SYSTEMS AND METHODS FOR WAREHOUSE MANAGEMENT

(71) Applicant: Jasci LLC, Elmsford, NY (US)

(72) Inventor: Daniel Raymond Napoli, Sarasota, FL (US)

(73) Assignee: Jasci LLC, Elmsford, NY (US)

( * ) Notice: Subject to any disclaimer, the term of this patent is extended or adjusted under 35 U.S.C. 154(b) by 378 days.

(21) Appl. No.: 15/887,699

(22) Filed: Feb. 2, 2018

(65) Prior Publication Data

US 2018/0225795 A1  Aug. 9, 2018

Related U.S. Application Data

(60) Provisional application No. 62/454,589, filed on Feb. 3, 2017, provisional application No. 62/457,038, filed on Feb. 9, 2017, provisional application No. 62/479,066, filed on Mar. 30, 2017.

(51) Int. Cl.
*G06Q 50/28* (2012.01)
*G06Q 10/06* (2012.01)
*G06Q 10/08* (2012.01)

(52) U.S. Cl.
CPC ....... *G06Q 50/28* (2013.01); *G06Q 10/06311* (2013.01); *G06Q 10/06316* (2013.01); *G06Q 10/087* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 5,524,077 | A | * | 6/1996 | Faaland | G06Q 10/1097 |
| | | | | | 705/7.21 |
| 5,671,361 | A | * | 9/1997 | Brown | G06Q 10/06 |
| | | | | | 705/7.23 |
| 6,216,098 | B1 | * | 4/2001 | Clancey | G06Q 10/10 |
| | | | | | 703/6 |
| 6,941,519 | B1 | * | 9/2005 | Jerome | H04L 67/12 |
| | | | | | 715/744 |
| 7,234,140 | B2 | * | 6/2007 | Dortmans | G06Q 10/06 |
| | | | | | 718/100 |

(Continued)

OTHER PUBLICATIONS

International Search Report and Written Opinion for PCT/US2018/016695 dated Apr. 3, 2018.

(Continued)

*Primary Examiner* — Alan S Miller
(74) *Attorney, Agent, or Firm* — Foley & Lardner LLP

(57) ABSTRACT

A method for configuring a task process of a work flow engine includes (a) providing a plurality of tasks selectable via a user interface of a task configurator, each task being an execution type or an action type task and (b) receiving a first selection of a first one or more tasks of the plurality of tasks corresponding to the execution type. The method further includes (c) receiving a second selection of a second one or more tasks corresponding to the action type, (d) receiving a selection of one or more paths between the first one or more tasks and the second one or more tasks, and (e) assembling the first one or more tasks and the second one or more tasks into a task process comprising an execution sequence of the first one or more tasks and the second one or more tasks.

18 Claims, 21 Drawing Sheets

(56) References Cited

U.S. PATENT DOCUMENTS

| | | | | |
|---|---|---|---|---|
| 7,289,966 | B2* | 10/2007 | Ouchi | G06Q 10/06311 705/7.13 |
| 7,443,303 | B2* | 10/2008 | Spear | G06Q 10/06 340/573.1 |
| 7,984,441 | B2* | 7/2011 | Briccarello | G06Q 10/109 718/102 |
| 8,170,901 | B2* | 5/2012 | Shukla | G06Q 10/0631 705/7.27 |
| 8,655,705 | B2* | 2/2014 | Riepshoff | G06Q 10/06316 705/7.26 |
| 8,738,414 | B1* | 5/2014 | Nagar | G06Q 10/101 705/7.25 |
| 8,806,613 | B2* | 8/2014 | Zafiroglu | G06Q 10/06 726/17 |
| 8,812,339 | B1* | 8/2014 | Stone, Jr. | G06Q 10/06316 705/7.26 |
| 9,805,326 | B2* | 10/2017 | Greene | G06Q 10/06316 |
| 9,886,956 | B1* | 2/2018 | Antunes | G06F 40/166 |
| 2002/0078432 | A1* | 6/2002 | Charisius | G06Q 10/06 717/102 |
| 2002/0184250 | A1* | 12/2002 | Kern | G06Q 30/06 |
| 2002/0188597 | A1* | 12/2002 | Kern | G06Q 30/06 |
| 2003/0018512 | A1* | 1/2003 | Dortmans | G06Q 10/06 718/100 |
| 2003/0036934 | A1* | 2/2003 | Ouchi | G06Q 10/06311 705/7.13 |
| 2003/0204431 | A1* | 10/2003 | Ingman | G06Q 99/00 705/7.16 |
| 2004/0039623 | A1* | 2/2004 | Setteducati | G06Q 10/10 705/7.24 |
| 2005/0066304 | A1* | 3/2005 | Tattrie | G06F 8/30 717/101 |
| 2006/0073464 | A1* | 4/2006 | Baldus | G09B 3/00 434/350 |
| 2006/0074730 | A1* | 4/2006 | Shukla | G06Q 10/0633 705/7.27 |
| 2007/0039001 | A1* | 2/2007 | Briccarello | G06Q 10/109 718/102 |
| 2008/0208615 | A1* | 8/2008 | Banavar | G06Q 10/109 705/1.1 |
| 2008/0222362 | A1* | 9/2008 | Chang | G06Q 10/10 711/133 |
| 2009/0070162 | A1* | 3/2009 | Leonelli | G06Q 10/0633 705/7.27 |
| 2012/0210265 | A1* | 8/2012 | Delia | G06F 3/0482 715/771 |
| 2013/0226639 | A1* | 8/2013 | Yokoyama | G06Q 10/06 705/7.14 |
| 2014/0006993 | A1* | 1/2014 | Deluca | G06F 9/451 715/772 |
| 2014/0095238 | A1* | 4/2014 | Dande | G06Q 10/06316 705/7.15 |
| 2015/0309769 | A1* | 10/2015 | Greene | G06Q 10/06 717/104 |
| 2017/0011356 | A1* | 1/2017 | Taira | G06Q 10/063116 |
| 2017/0116038 | A1* | 4/2017 | Netto | G06F 9/5077 |
| 2017/0339131 | A1* | 11/2017 | Zafiroglu | H04L 63/0823 |
| 2018/0130027 | A1* | 5/2018 | Mullings | G06Q 10/1097 |
| 2018/0204169 | A1* | 7/2018 | Cao | G06Q 10/087 |

OTHER PUBLICATIONS

Non-Final Office Action for U.S. Appl. No. 15/887,759, dated Mar. 31, 2020.

* cited by examiner

Smart Task GUI
204: Search Screen

```
Smart Task Configurator

Enter Application:_____  or Task:_____ or Execution Group:_____  or Execution Type:_____  or Execution Device:_____ or Execution Sequence:_____  or Any Part of the Execution Sequence Description:_____ or Enter Tenant Name:_____  or Menu Name:_____
```

*FIG. 3A*

Example Executions 216

| Execution | Phase | RF Access/ Glasses | Automation? | Operation |
|---|---|---|---|---|
| WMS | General | RF | | Display Location |
| WMS | General | RF | | Scan Location |
| WMS | General | RF | | Scan Check Digit |
| WMS | Pick | RF | | Display Qty Pick |
| WMS | Pick | RF | | Verify Qty |
| WMS | Pick | Glasses | | Show Path |
| WMS | Pick | Glasses | | Show Location |
| WMS | Pick | Glasses | | Show Product |
| WMS | Slotting | | Yes | Fill Bulk Location |
| WMS | Slotting | | Yes | Fill Prime |
| WMS | Allocation | | Yes | Pull Full Cases |
| WMS | Allocation | | Yes | Pull Eachs from Prime |

*FIG. 3C*

In-progress Creation of
Execution Sequence

| Sequence | Type | Execution | GoTo | Description | Message |
|---|---|---|---|---|---|
| 01 | Execution | Display Location | | Display Location | |
| 02 | Execution | Scan Location | | Scan Location | |
| 03 | Action | If Error | 01 | If Error Display Message | Invalid Location |

*FIG. 3D*

Example Slotting Execution Sequence

| Execution - Example | The following is an example Execution Slotting |

| Sequence | Function | Description |
|---|---|---|
| 001 | Tag | Start |
| 002 | Opportunity | Check if a replenishment can be cancelled or reduced for this qty |
| 003 | If Exit Flag = "Y" go to End | Checks if Qty was Slotted, if yes ends |
| 004 | If Used Flag = "Y" go to Start | Check if additional replenishment can be cancelled |
| 005 | Fill Prime | Check if qty will fit into existing Prime |
| 006 | If Exit Flag = "Y" go to End | Checks if Qty was Slotted, if yes ends |
| 007 | Fill existing Reserve | Checks if qty will fit in existing Reserve location |
| 008 | If Exit Flag = "Y" go to End | Checks if Qty was Slotted, if yes ends |
| 009 | Find open Reserve | Find and open existing Reserve location |
| 010 | No Location | Print No Location available Label |
| 011 | Tag | End |
| 012 | End Execution | End execution Sequence |

*FIG. 3E*

Work Order Profile Management

[Add Profile]

| Profile Name | Tab | Description | Options |
|---|---|---|---|
| Co. 1 orders | Co. 1 Product | Single Product | [Delete] [Edit] |
| Co. 2 orders | Co. 2 Product | Multiple Products | [Delete] [Edit] |

*FIG. 7*

Preference Entry

| | Value | Condition | Preference Field |
|---|---|---|---|
| User Estimated Duration | Work or Lines or Qty | | ValueAlpha3 |
| Menu Wait Time Flash Yellow Alert | | Yellow Alert | ValueNumeric3 |
| Menu Wait Time Flash Red Alert | | Red Alert | ValueNumeric4 |
| Menu Wait Time Flash Blinking Alert | | Blinking Alert | ValueNumeric5 |
| Check Out Time In | 999999 Minutes | | ValueNumeric7 |

*FIG. 8*

| Work Type | Work Control Number | Work Zone | Status | Team Member | Lines | Qty | Open Lines | Open Qty | Qty Cut | AGING Hours | | |
|---|---|---|---|---|---|---|---|---|---|---|---|---|
| Pick | 44444 | 001 | Open | | 9 | 79 | 9 | 79 | | 23 | Lookup | Force |
| Pick | 45454 | 001 | Assigned | Dan N | 5 | 65 | 5 | 65 | | 5 | Lookup | Force |
| Restock | 33333 | 001 | Open | | 6 | 56 | 6 | 56 | | 11 | Lookup | Force |
| Restock | 66666 | 001 | Working | Ed J | 11 | 11 | 8 | 8 | | 3 | Lookup | Force |

Table A

| Profile | Description | Work | Lines | Qty | Labor | AGING Hours | Average Priority | Average Super Priority |
|---|---|---|---|---|---|---|---|---|
| Company 1 | Company 1 Orders | 325 | 879 | 4879 | 33:29 | 23 (RED) | 0.071 | 0.071 |
| Company 1 Single | Company 1 Orders Singles | 765 | 765 | 765 | 22:19 | 5 | 0.007 | 0.014 |
| Singles | Orders Singles | 995 | 995 | 995 | 35:01 | 3 | 0.003 | 0.003 |

Table B

*FIG. 10*

SYSTEMS AND METHODS FOR WAREHOUSE MANAGEMENT

RELATED APPLICATIONS

The present application claims the benefit of and priority to each of the following: U.S. Provisional Application No. 62/454,589, titled SYSTEMS AND METHODS FOR WAREHOUSE MANAGEMENT and filed on Feb. 3, 2017, U.S. Provisional Application No. 62/457,038, titled SYSTEMS AND METHODS FOR WAREHOUSE MANAGEMENT and filed on Feb. 9, 2017, and U.S. Provisional Application No. 62/479,066, titled SYSTEMS AND METHODS FOR WAREHOUSE MANAGEMENT and filed on Mar. 30, 2017, all of which are incorporated herein by reference.

FIELD OF THE DISCLOSURE

The present application relates generally related to systems and methods for innovative and improvement in application work flow management and execution, and in particular in some implementations innovative and improved work flow and task management.

BACKGROUND

Developing application work flows can be challenging and complex, such as for example for warehouse management systems. A warehouse management system, in general, manage the distribution of goods and products from warehouses and distribution centers to fulfill received orders. Tracking and managing the distribution of such goods and products from order to receipt by buyer such as via a workflow can be complex, challenging and costly with a high level of effort and continuous need of updated information.

SUMMARY

The systems and methods of the present solution optimizes the logistical flow of a work flow management, such as for example, for a warehouse management system, the flow of work from a distribution center from inbound receiving to order fulfillment. In this example, the systems and method of the present solution orchestrates the movements of inventory, orders, labor, locations and equipment in real-time and can be implemented and uses via the cloud or remotely on a cloud service provider. By providing the functionality on the cloud, the present solution provides work flow management service for applications, such as a Warehouse Management as a Service or WMaaS. Such a WMaaS helps overcome the challenges with existing systems by providing an easier to use, less expensive, scalable, flexible and more efficient and effective warehouse management system that provides optimizations and improvements to the logical flow of distribution and real-time information and analytics. Although, at times, the systems and methods of the present solution are discussed in connection with a warehouse management systems, the systems and methods of the present solution may be used in any context or domain, such as manufacturing, healthcare, finance, business, operations, etc.

In one or more embodiments, according to a first aspect, a method for configuring a task process of a work flow engine includes providing, via a user interface of a task configurator, a plurality of tasks selectable via the user interface, each of the plurality of tasks having a sequence execution type of a plurality of sequence execution types, the plurality of sequence execution types comprising an execution type and an action type; receiving, via the user interface of the task configurator, a first selection of a first one or more tasks of the plurality of tasks corresponding to the execution type; and receiving, via the user interface of the task configurator, a second selection of a second one or more tasks corresponding to the action type. The method further includes receiving, via the user interface of the task configurator, a selection of one or more paths between the first one or more tasks and the second one or more tasks; and assembling, by the task configurator according to the one or more paths, the first one or more tasks and the second one or more tasks into a task process comprising an execution sequence of the first one or more tasks and the second one or more tasks.

In some embodiments, the first one or more tasks corresponding to the execution type of the plurality of sequence execution type identifies an execution providing a predetermined functionality.

In some embodiments, the second one or more tasks corresponding to the action type of the plurality of sequence execution type identifies an instruction to be executed in the execution sequence to provide logic to the execution sequence.

In some embodiments, at least one of the tasks of the task process references an execution bean for communication between execution sequences.

In some embodiments, the method further includes generating an enumerated list of tasks of the execution sequence, each task of the tasks of the execution sequence identified by a unique sequence number.

In one or more embodiments, according to another aspect, a system for configuring a task process of a work flow engine includes a processor, coupled to memory, and a task configurator executable on the processor. The task configurator is configured to provide, via a user interface, a plurality of tasks selectable via the user interface, each of the plurality of tasks having a sequence execution type of a plurality of sequence execution types, the plurality of sequence execution types comprising an execution type and an action type, and to receive, via the user interface, a first selection of a first one or more tasks of the plurality of tasks corresponding to the execution type. The task configurator is further configured to receive, via the user interface, a second selection of a second one or more tasks corresponding to the action type; to receive, via the user interface, a selection of one or more paths between the first one or more tasks and the second one or more tasks; and to assemble, according to the one or more paths, the first one or more tasks and the second one or more tasks into a task process comprising an execution sequence of the first one or more tasks and the second one or more tasks.

In some embodiments, the first one or more tasks corresponding to the execution type of the plurality of sequence execution type identifies an execution providing a predetermined functionality.

In some embodiments, the second one or more tasks corresponding to the action type of the plurality of sequence execution type identifies an instruction to be executed in the execution sequence to provide logic to the execution sequence.

In some embodiments, at least one of the tasks of the task process references an execution bean for communication between execution sequences.

In some embodiments, the task processor is further configured to generate an enumerated list of tasks of the execution sequence, each task of the tasks of the execution sequence identified by a unique sequence number.

In one or more embodiments, according to another aspect, a method of executing a task process configured for a work flow engine includes identifying, by a work flow engine, a configuration of a task process, the task process comprising an execution sequence assembled from a selection of one or more executions and one or more actions and arranged into one or more paths; identifying, by the work flow engine, a first task of the task process according to the one or more paths, the first task comprising a first execution of the one or more executions, the first execution providing a predetermined functionality, and executing, by the work flow engine, the predetermined functionality of the first execution. The method further includes identifying, by the work flow engine, a second task of the task process according to the one or more paths, the second task comprising a first action of the one or more actions, the first action providing predetermined logic for the execution sequence; executing, by the work flow engine, the predetermined logic of the first action of the second task; and determining, by the work flow engine, a third task of the task process as a result of executing the predetermined logic of the action of the second task.

In some embodiments, the predetermined functionality of the third task of the task process comprises a second action of the one or more actions, the second action being a GOTO action that comprises directing the task process to a fourth task of the task process.

In some embodiments, the predetermined functionality of the second action further comprises displaying an error message.

In some embodiments, the predetermined functionality of the first execution comprises displaying a message requesting that information be input to the work flow engine and receiving the information.

In some embodiments, the predetermined logic for the execution sequence provided by the first action comprises determining if the received information is valid, and determining the third task accordingly.

In one or more embodiments, according to another aspect, a system for executing a task process configured for a work flow engine includes a processor coupled to memory, and a work flow engine executable by the processor. The work flow engine is configured to identify a configuration of a task process, the task process comprising an execution sequence assembled from a selection of one or more executions and one or more actions and arranged into one or more paths; identify a first task of the task process according to the one or more paths, the first task comprising a first execution of the one or more executions, the first execution providing a predetermined functionality; and execute the predetermined functionality of the first execution. The work flow engine is further configured to identify a second task of the task process according to the one or more paths, the second task comprising a first action of the one or more actions, the first action providing predetermined logic for the execution sequence; execute the predetermined logic of the first action of the second task; and determine a third task of the task process as a result of executing the predetermined logic of the action of the second task.

In some embodiments, the third task of the task process comprises a second action of the one or more actions, the second action being a GOTO action, the predetermined functionality of the second action comprising directing the task process to a fourth task of the task process.

In some embodiments, the predetermined functionality of the second action further comprises displaying an error message.

In some embodiments, the predetermined functionality of the first execution comprises displaying a message requesting that information be input to the work flow engine and receiving the information.

In some embodiments, the predetermined logic for the execution sequence provided by the first action comprises determining if the received information is valid, and determining the third task accordingly.

In one or more embodiments, according to another aspect, a method for determining orders for picking based on priorities and work order profiles includes identifying, by a work flow manager, a plurality of work order profiles to be processed, each work profile including a plurality of work orders; retrieving, by the work flow manager, one or more preferences for at least one of the plurality of work order profiles; and determining, by the work flow manager, a quantity of labor hours for each work order of the at least one work order profile based on the one or more preferences. The method further includes determining, by the work flow manager, numbers of hours previously calculated for each work order of the at least one work order profile; determining, by the work flow manager, a priority for the at least one work order profile based on the respective numbers of hours; calculating, by the work flow manager, an average priority for the at least one work order profile based on the priority and the quantity of labor hours; and displaying, by the work flow manager, an enumerated list of work order profiles including the at least one work order profile ranked based on at least the average priority.

In some embodiments, the method further includes calculating, by the work flow manager, an average super priority for each work order based on an adjustable value, wherein the enumerated list of work orders is ranked further based on the average super priority.

In some embodiments, the method further includes receiving, by the work flow manager, the adjustable value via a GUI that displays a slider for setting the adjustable value.

In some embodiments, each work order of the at least one work order profile includes a work value, a lines value, and a quantity value, and the one or more preferences of the work order profile include a preference to determine the quantity of labor hours based on one of the work value, the lines value, and the quantity value.

In some embodiments, the method further includes calculating the average priority for the at least one work order profile comprises dividing a sum of the number of hours previously calculated for the work orders of the at least one work order profile by a sum of the labor hours of the work orders of the at least one work order profile.

In one or more embodiments, according to another aspect, a system for determining orders for picking based on priorities and work profiles includes a processor, coupled to memory, and a work flow manager executable on the processor. The work flow manager is configured to identify a plurality of work order profiles to be processed, each work profile including a plurality of work orders; retrieve one or more preferences for at least one of the plurality of work order profiles, and determine a quantity of labor hours for each work order of the at least one work order profile based on the one or more preferences. The work flow manager is further configured to determine numbers of hours previously calculated for each work order of the at least one work order profile; determine, by the work flow manager, a priority for the at least one work order profile based on the respective numbers of hours; calculate an average priority for the at least one work order profile based on the priority and the quantity of labor hours; and display an enumerated list of work order profiles including the at least one work order profile ranked based on at least the average priority.

In some embodiments, the work flow manager is further configured to calculate an average super priority for the at least one work order profile based on an adjustable value, wherein the enumerated list of work order profiles is ranked further based on the average super priority.

In some embodiments, the work flow manager is further configured to receive the adjustable value via a graphical under interface that displays a slider for setting the adjustable value.

In some embodiments, wherein each work order of the at least one work order profile includes a work value, a lines value, and a quantity value, and the one or more preferences of the work order profile include a preference to determine the quantity of labor hours based on one of the work value, the lines value, and the quantity value.

In some embodiments, wherein calculating the average priority for the at least one work order profile comprises dividing a sum of the number of hours previously calculated for the work orders of the at least one work order profile by a sum of the labor hours for the work orders of the at least one work order profile.

In one or more embodiments, according to another aspect, a method for determining orders for picking based on priorities and work order profiles includes identifying, by a work flow manager, a plurality of work order profiles to be processed, each work profile including a plurality of work orders; retrieving, by the work flow manager, one or more preferences for at least one of the plurality of work order profiles including one or more alert preferences; and determining, by the work flow manager, a quantity of labor hours for each work order of the at least one work order profile. The method further includes determining, by the work flow manager, numbers of hours previously calculated for each work order of the at least one work order profile; determining, by the work flow manager, an alert status for the at least one work order profile based on the alert preferences and the numbers of hours previously calculated for each work order of the at least one work order profile; determining, by the work flow manager, a priority for the at least one work order profile based on the respective numbers of hours; and displaying in a GUI, by the work flow manager, an enumerated list of work order profiles including the at least one work order profile ranked based on at least the priority, along with an indication of the alert status of the at least one work order profile.

In some embodiments, the one or more alert preferences specify one or more thresholds for numbers of hours previously calculated for work orders, each threshold corresponding to at least one alert status.

In some embodiments, each alert preference specifies a single threshold corresponding to a single alert status, and wherein determining an alert status for the at least one work order profile further comprises determining the alert status corresponding to the highest threshold surpassed by the numbers of hours previously calculated.

In some embodiments, the indication of the alert status displayed in the GUI comprises an indicator having a color corresponding to alert status and/or a blinking indicator.

In some embodiments, the number of hours previously calculated for each work order of the at least one work order profile are numbers of hours since the work orders have been instantiated.

In one or more embodiments, according to another aspect, a system for determining orders for picking based on priorities and work profiles includes a processor, coupled to memory, and a work flow manager executable on the processor. The work flow manager is configured to identify a plurality of work order profiles to be processed, each work profile including a plurality of work orders; retrieve one or more preferences for at least one of the plurality of work order profiles including one or more alert preferences; and determine a quantity of labor hours for each work order of the at least one work order profile. The work flow manager is further configured to determine numbers of hours previously calculated for each work order of the at least one work order profile; determine an alert status for the at least one work order profile based on the alert preferences and the numbers of hours previously calculated for each work order of the at least one work order profile; determine a priority for the at least one work order profile based on the respective numbers of hours; and display in a GUI an enumerated list of work order profiles including the at least one work order profile ranked based on at least the priority, along with an indication of the alert status of the at least one work order profile.

In some embodiments, the one or more alert preferences specify one or more thresholds for numbers of hours previously calculated for work orders, each threshold corresponding to at least one alert status.

In some embodiments, each alert preference specifies a single threshold corresponding to a single alert status, and wherein determining an alert status for the at least one work order profile further comprises determining the alert status corresponding to the highest threshold surpassed by the numbers of hours previously calculated.

In some embodiments, the indication of the alert status displayed in the GUI comprises an indicator having a color corresponding to alert status and/or a blinking indicator.

In some embodiments, the number of hours previously calculated for each work order of the at least one work order profile are numbers of hours since the work orders have been instantiated.

BRIEF DESCRIPTION OF THE DRAWINGS

FIG. 3A is a graphical representation of an implementation of a user interface of a work flow management system.

FIG. 3C is a listing of example executions for an execution sequence.

FIG. 3D is a graphical representation of an example creation of an execution sequence.

FIG. 3E is a listing of an example execution sequence.

FIG. 7 is a graphical representation of an implementation of work profile management.

FIG. 8 is a graphical representation of an implementation of preference management.

FIG. 10 is a graphical representation of example work orders and work order profiles.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes implementation of a smart task configuration and execution system, such as for a warehouse management system.

Section C describes implementation of work flow management using work order profiles and prioritization.

A. Computing and Network Environment

Figure 1A:
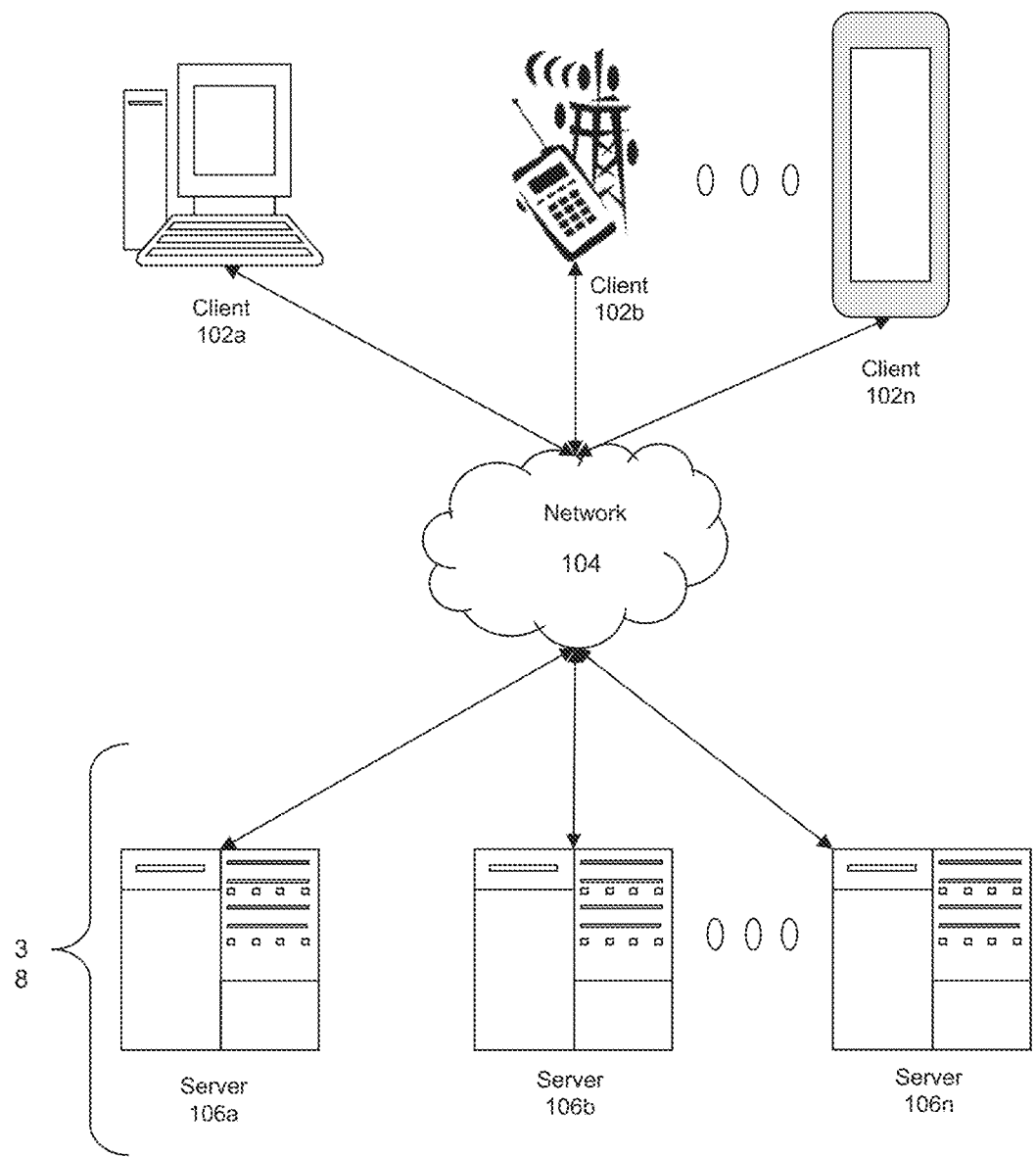
FIG. 1A is a block diagram depicting an embodiment of a network environment comprising local devices in communication with remote devices.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
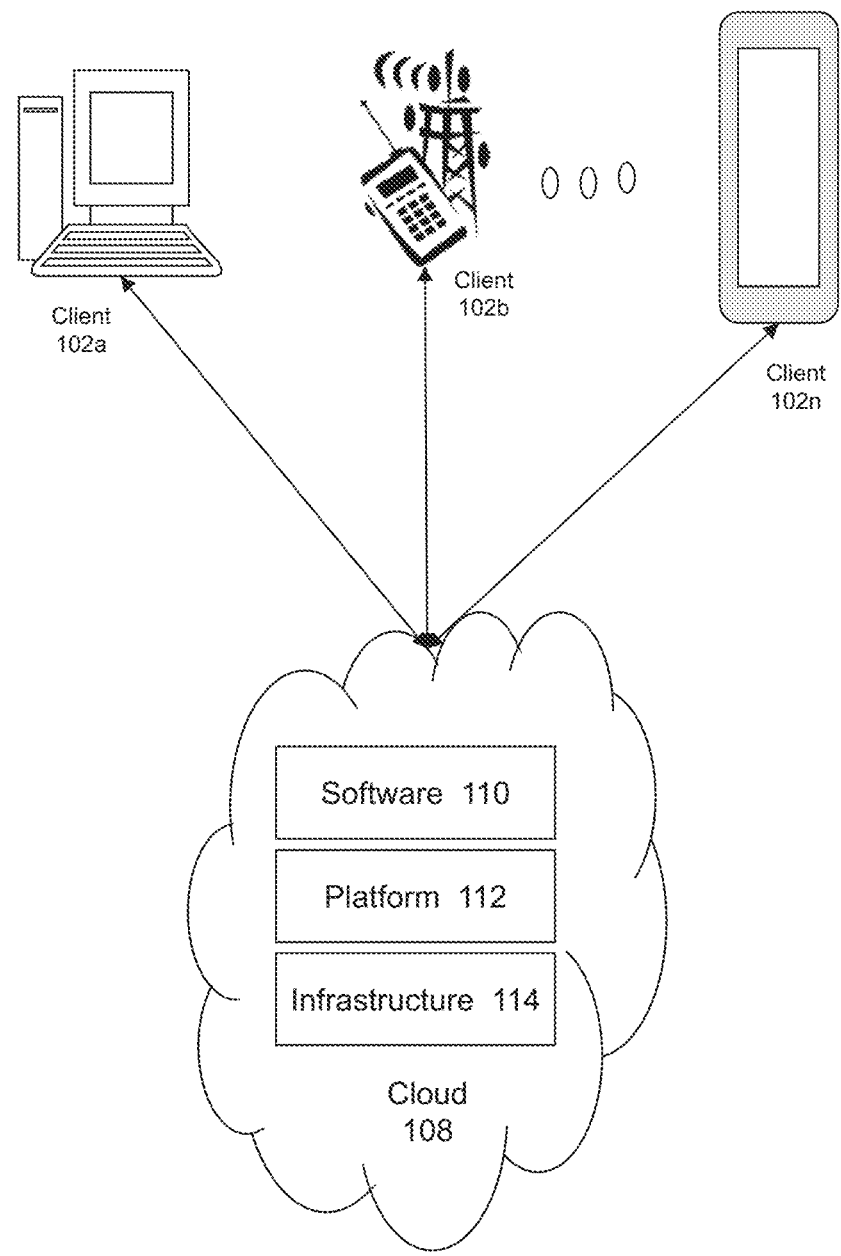
FIGS. 1B-1D are block diagrams depicting embodiments of computers useful in connection with the methods and systems described herein.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
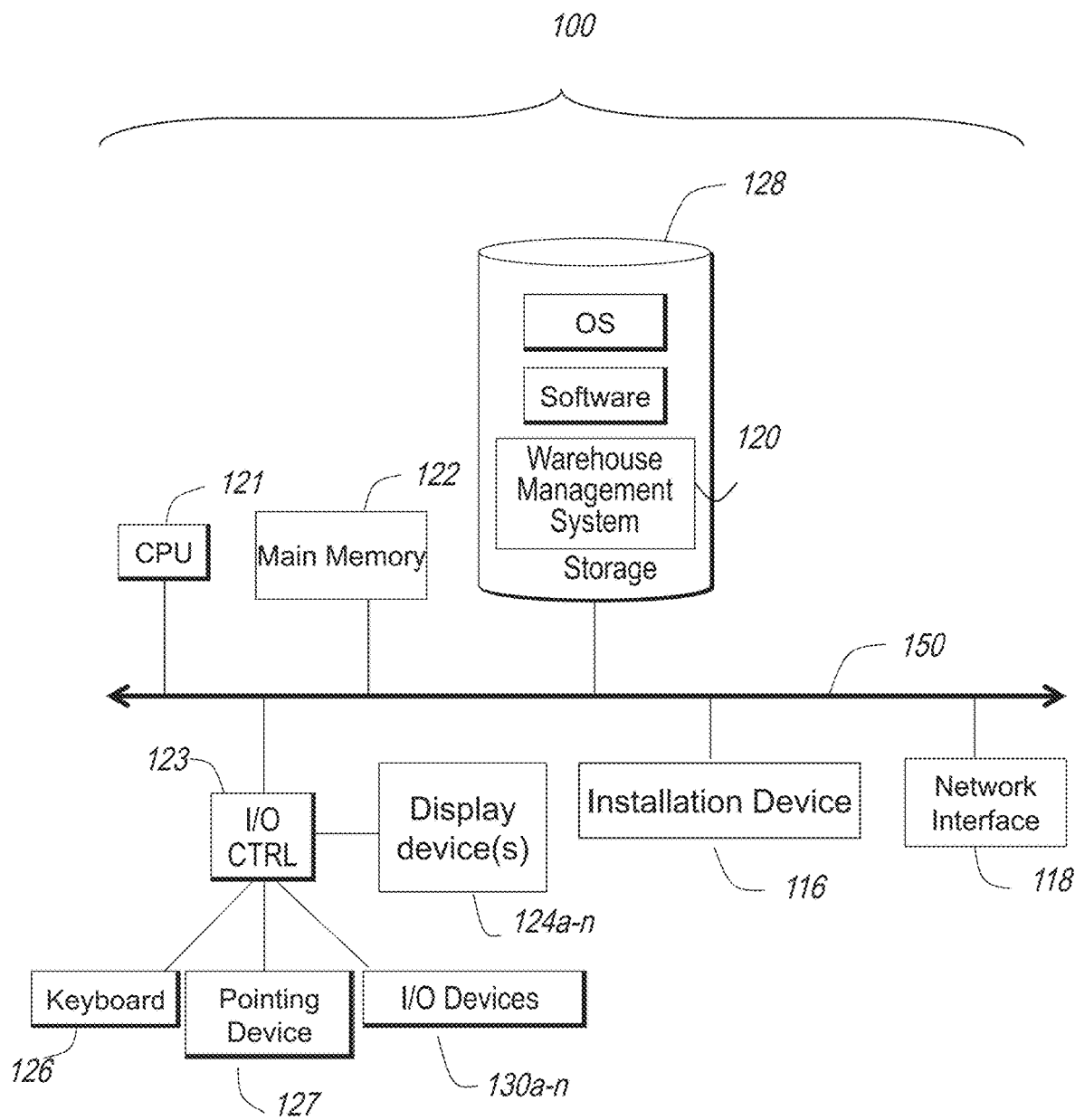
Figure 1D:
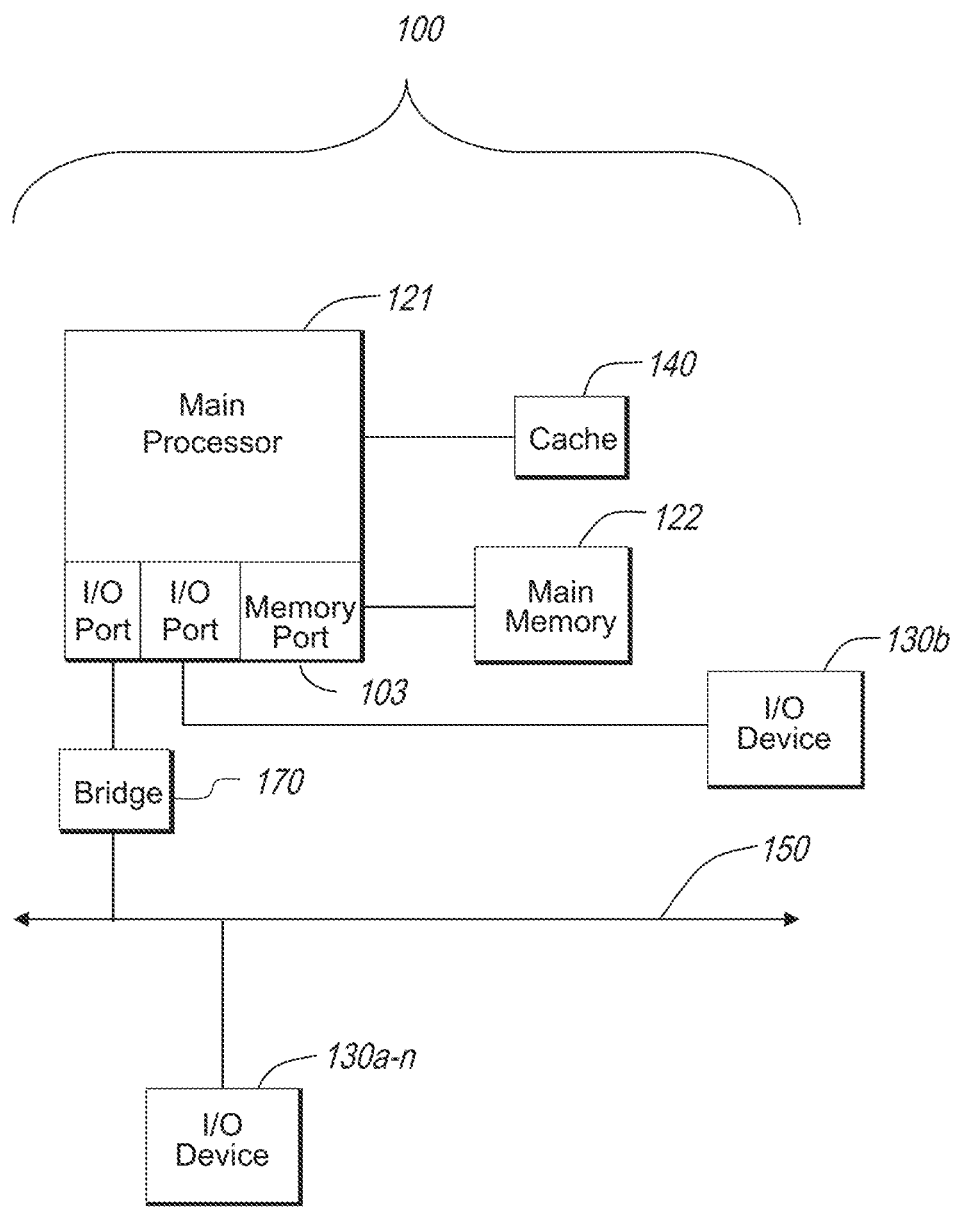

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and software of a warehouse management system (WMS) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAIVI), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the warehouse management system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. SmartTask Configuration and Execution

Systems and methods of the present solution provide an improvement to the design and implementation of a work flow engine, sometimes referred herein as a SmartTask engine, to create warehouses processes without coding providing for highly efficient creating, testing and training (e.g. in minutes). Systems and methods of the present solution allows for the created processes to be delivered and implemented via an application on any type of mobile platform. Furthermore, aspects of the present solution allow for the user interface experience to be automatically generated and delivered to different types of mobile experience form factors such as handhelds, tablets, wearables and/or voice based systems.

The SmartTask workflow configuration and execution engine (e.g. workflow engine) improves the technology of warehouse and fulfillment systems that hard-code optimizations into the workflow without actually knowing if there would be any improvement from the optimization until deployed much later. With the SmartTask configuration and execution engine, a user can implement a new process from concept within minutes, in the same day, without custom coding to enhance speed, accuracy and predictability with the implementation. The workflow technology of the Smart-Task system includes a workflow library of executions and actions to include predefined functionality and workflow logic to optimize the process. Such workflows can be designed as drag and drops of executions and actions via a user interface to form a sequence of tasks, from which a flow diagram may be automatically created or generated. User interfaces to present the functionality of the workflows may be automatically generated based on the device type, such as a mobile user interfaces for a tablet or mobile device that presents user interfaces based on the work flow.

In some aspects, the workflows may be designed and implemented using the techniques and processes of the present solution for warehouse management functionality. SmartTask based workflows may be created for inbound activity, such as receiving, returns, cross-dock, quality assurance, and put-aways. SmartTask based workflows may be created for inventory activity, such as cycle counts, replenishments and audits. SmartTask based workflows may be created for outbound activity, such as picking, packing, put-walls and shipping.

In some embodiments, a graphical user interface (GUI) is provided that allows for configuration of a workflow as a plurality of tasks for a process, such as by generating an "execution sequence" that includes one or more executions. The tasks or executions have a type (e.g., execution type), and may be, for example, be an "execution" type or an "action" type. An execution type task (referred to herein as an execution) can, for example, have a predetermined functionality that specifies an action to be performed, such as any of the execution type executions in FIGS. 3A-3D. An action type task (referred to herein as an action) can, for example, have a predetermined functionality that provides for a logic flow to the execution sequence. For example, an action can provide a GOTO logic at a certain point in the execution sequence, or can provide for an IF logic such as a branching path at a certain point in the execution sequence, each branch corresponding to a condition being satisfied or not satisfied. The GUI can configuration and/or generate an execution sequence that includes one or more executions, one or more actions, and paths that link the tasks of the execution sequence.

Figure 2A:
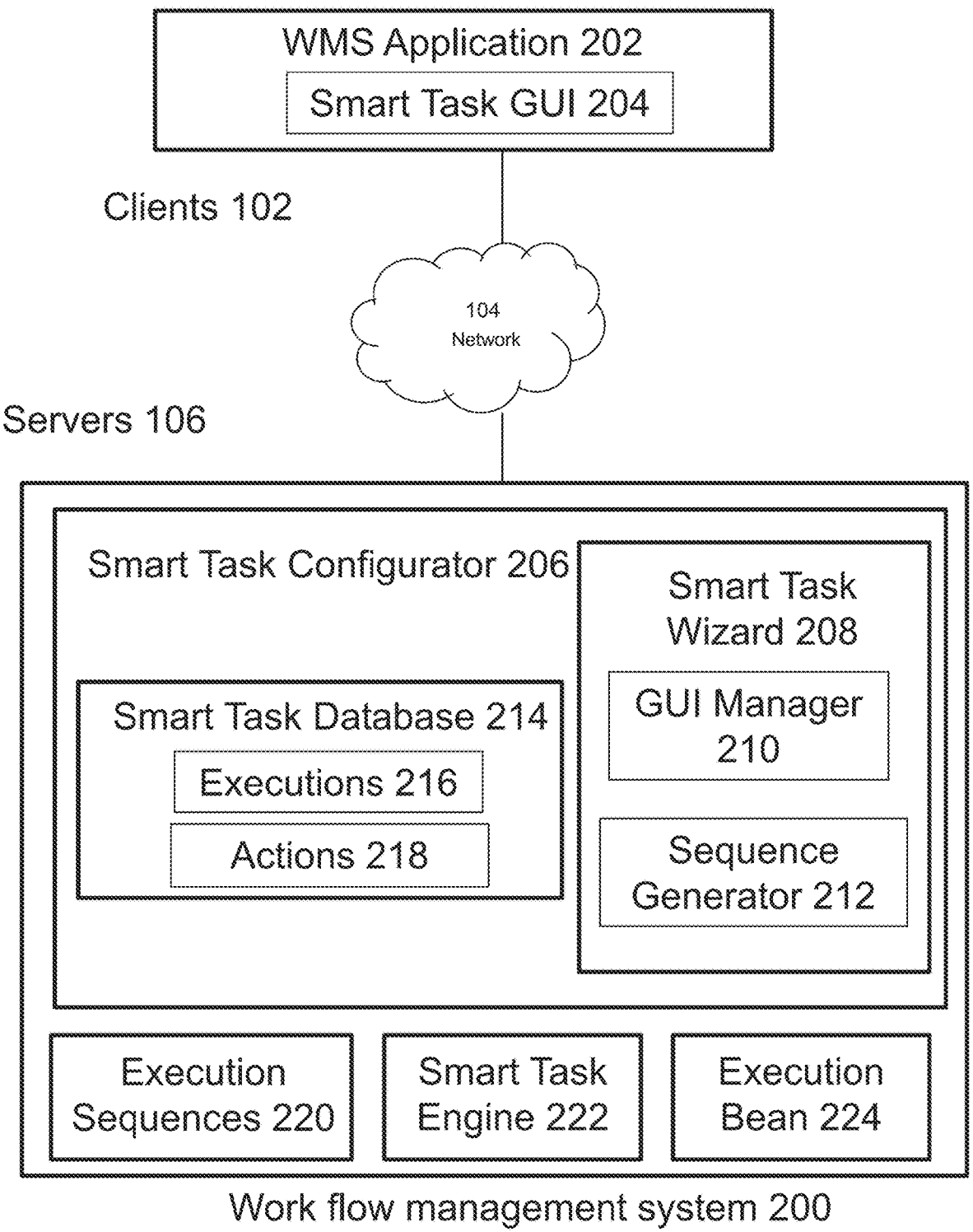
FIG. 2A is a block diagram of embodiments of a work flow management system.

Referring now to FIG. 2A, FIG. 2A is a block diagram showing an embodiment of a work flow management system 200. The work flow management system 200 can be included in the warehouse management system 120 shown in FIG. 1C, and can be included in the work flow engine. The work flow management system 200 can include or can be executed on one or more of the servers 106. The work flow management system 200 can include one or more applications, services, routines, servers, daemons, or other executable logics for configuring a task process, including one or more of a smart task configurator 206, a smart task engine 222, and an execution bean 224. The work flow management system 200 can also include, access, maintain or manage one or more data structures, including but not limited to execution sequences 220.

The smart task configurator 206 can include one or more applications, services, routines, servers, daemons, or other executable logics for configuring an execution sequence, including one or more of a smart task wizard 208. The smart task configurator 206 can also include, access, maintain or manage one or more data structures, including but not limited to the smart task database 214. The smart task configurator 206 can provide for the one or more clients 102, which can in in communication with the work flow management system 200 over the network 104, to generate one or more execution sequences that can be used to implement a task process (e.g. a warehouse picking process or a warehouse slotting process). For example, the one or more clients 102 can execute a WMS application 202 (which can be provided by the smart task configurator 206, or which can be otherwise accessed), which can display a smart task GUI 204 by accessing one or more local or remote resources. In some embodiments, the WMS application 202 can transmit a request to the work flow management system 200 to provide resources for the smart task GUI 204. By using the smart task GUI 204, the one or more clients 102 can cause the smart task configurator 206 to generate one or more execution sequences.

The smart task wizard 208 of the smart task configurator 206 can include one or more applications, services, routines, servers, daemons, or other executable logics for generating one or more execution sequences, including one or more of a GUI manager 210 and a sequence generator 212. The smart task wizard 208 can generate one or more execution sequences based on input received from the WMS application 202 executing on the one or more clients 102. This can allow one or more users of the one or more clients 102 to readily and efficiently generate execution sequences, or to otherwise configure a task process.

The GUI manager 210 can provide the smart task GUI 204 to the one or more clients 102, (e.g. to the WMS application 202 executing on the one or more clients 102,), and can receive information related to the smart task GUI 204, such as inputs received via the smart task GUI 204. This can provide for a user of the WMS application 202 generating an execution sequence using the smart task configurator 206. Although in FIG. 2A the GUI manager 210 is depicted as part of the work flow management system 200 on the one or more servers 106, the GUI manager 210 may be executed on the one or more clients 102 (e.g. as part of the WMS application 202), and outputs of the GUI manager 210 (e.g. information for generating execution sequences) may be transmitted to the work flow management system 200 via the network 104. The GUI manager 210 may provide user interface via web pages served to and/or loaded in a browser.

The GUI manager 210 can provide the smart task GUI 204 to the WMS application 202 responsive to receiving a request from the WMS application 202. The smart task GUI 204 can include an interface that provides a search screen (e.g. as shown in FIG. 3A) for searching for saved or stored execution sequences. Execution sequences found via the search screen can be modified, copied, or deleted. Thus a user of the smart task GUI 204 can, but need not, generate an execution sequence from scratch. The user of the smart task GUI 204 may also use the search screen to determine whether a suitable execution sequence for certain work process is available, or whether such a suitable execution sequence needs to be created.

Figure 3B:
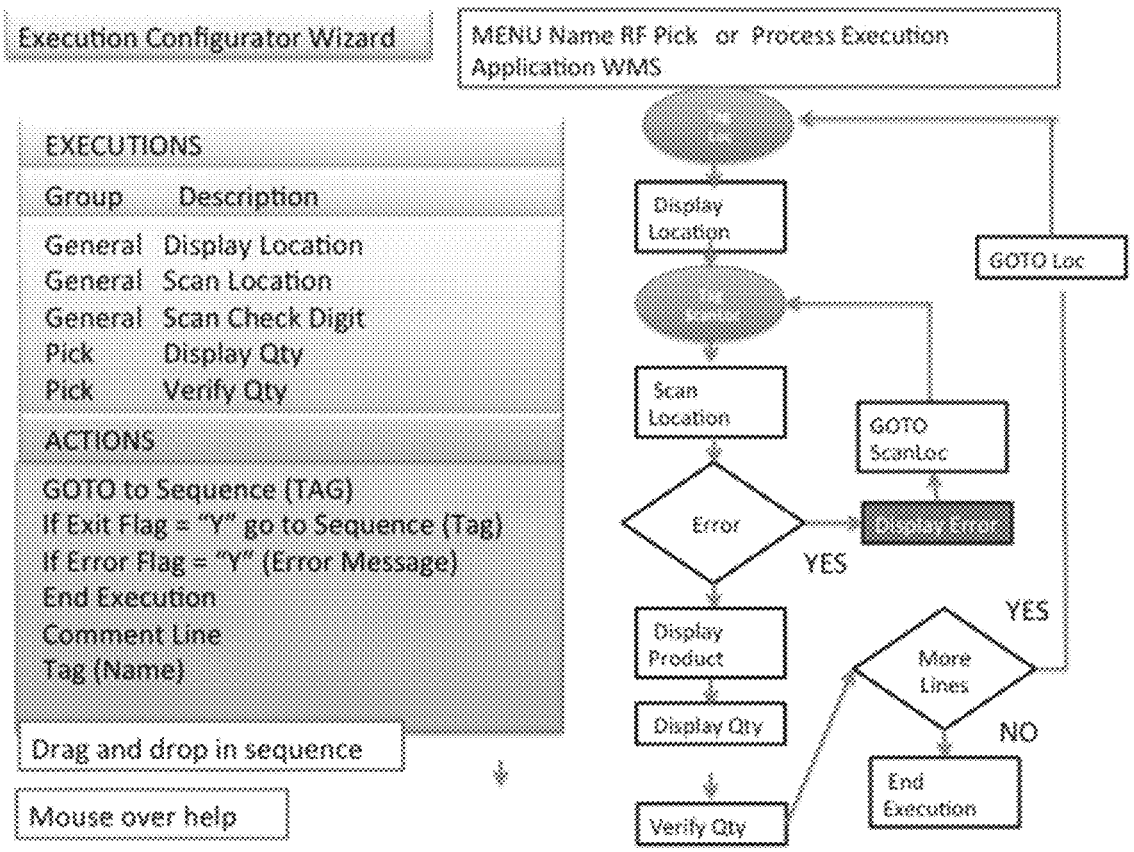
FIG. 3B is a graphical representation of an implementation of a user interface for configuring an execution sequence.

The smart task GUI 204 can provide an interface whereby an execution sequence is generated. For example, in some embodiments the smart task GUI 204 can provide a sequence creation screen (e.g. as shown in FIG. 3B) for generating an execution sequence. The sequence creation screen may provide for assembling an execution sequence via a drag and drop process. For example, as shown in FIG. 3B (and as described in more detail below in reference to FIG. 3B), the smart task GUI 204 may provide a list of executions and a list of actions. The smart task GUI 204 may provide for dragging a first task (e.g. an execution) on to a particular area of the smart task GUI 204, dragging a second task (e.g. an action) on to the particular area of the smart task GUI 204, and connecting the first task and the second task via a path. The connection via a path may be implemented automatically by the smart task GUI 204, or may be implemented manually by a user. Thus, two tasks can be connected via drag and drop to generate at least a portion of an execution sequence. More tasks can be added to the execution sequence in a similar manner. By using executions to add desired functionalities to the execution sequence, and by using actions to add logic to the execution sequence, a suitable execution sequence can be generated to implement a WMS process, for example, without coding.

The smart task GUI 204 can provide for saving a given execution sequence. For example, in some embodiments a save button may be displayed by the smart task GUI 204, and if the save button is activated the WMS application 202 may generate an execution sequence based on the configuration of the execution sequence shown in the smart task GUI 204. The WMS application 202 may transmit the generated execution sequence to the GUI manager 210.

The smart task GUI 204 can display a sequence listing view of an execution sequence and/or a flow chart view of the execution sequence and/or switch between the two. The sequence listing view may show an enumerated ordered list of execution sequences, such as those illustrated in FIGS. 3D-3E. The smart task GUI can automatically generate a flow chart and/or display a flow chart for an execution sequence, such as the flow chart illustrated in FIG. 3B.

In some other embodiments, the WMS application 202 may (e.g. upon activation of a save button) transmit to the GUI manager 210 information regarding inputs received by the smart task GUI 204. The GUI manager 210 may forward the received information regarding inputs to the sequence generator 212 of the smart task wizard 208. Based on the received inputs, the sequence generator 212 may generate and store a corresponding execution sequence, including any executions, actions, or paths specified or indicated by the one or more inputs. The sequence generator 212 may store the execution sequence on the one or more servers 106 (e.g. in the execution sequences 220 data structure).

The sequence generator 212 may generate code that, when executed by the smart task engine 222, implements the execution sequence and the executions and actions included in the execution sequence according to paths of the execution sequence. The code may comprise executable instructed in a form suitable for execution on a device, such as device type specified by any header information or other data associated with an execution sequence. The sequence generator 212 may reference one or more tables that identify the executions, actions, and paths of the execution sequence to generate the code implements the execution sequence. Furthermore, the sequence generator 212 may reference information associated with the execution sequence to generate the executable code. For example, an execution sequence may include, or may be associated with, header information that includes one or more of the following: an execution sequence type (e.g. picking, slotting, allocation, or any other type of warehouse management process), an execution device on which the complete execution sequence may be implemented (e.g. a tablet, a mobile device, or any device with a scanner), one or more types of input received via the execution sequence (e.g. RF inputs, glasses (e.g. that provide a display viewable to a user, such as GOOGLE GLASS or other similar devices), or devices that provide for voice inputs), or a group (e.g. specifying a particular company or client for whom the execution sequence is available).

The sequence generator 212 may generate code corresponding to the header information. For example, the sequence generator 212 may generate code that is executable by the specified execution device (and, for example, by an operating system of the specified execution device that may be inferred or may be also specified in the header). The sequence generator 212 may generate code for receiving the specified types of inputs. The sequence generator 212 may generate code corresponds to preferences of the specified group (e.g. in a programming language, or complying with programming specifications of a specified company or client). The sequence generator may generate code that provides, presented or displays user interfaces for a designated, targeted or identified form factor, such as a mobile device, a table or phone or to use a certain input such as touch, voice or otherwise. The sequence generator may generate code that provides, presented or displays user interfaces and/or code for a designated, targeted or identified operating system or platform, such as Android operating system.

The code generated by the sequence generator may be stored and may be executed at a later date by the smart task engine 222, described below, or may be assessed and copied or modified by the smart task configurator 206. The code may be delivered or downloaded and/or installed to an application on a client device, such as a tablet or other mobile device. The code may be delivered to be executed on, in or at a browser on a client device, such as a tablet or other mobile device.

In one or more embodiments, the smart task configurator 206 can include a smart task database 214. The smart task database 214 may include predefined tasks that can be used by the smart task wizard 208 to generate or modify execution sequences. The smart task database 214 can include one or more executions 216, and one or more actions 218. The executions 216 can, for example, have a predetermined functionality that specifies an action to be performed, including any user interfaces for receiving input or providing output associated with such functionality. The actions 218 can, for example, have a predetermined functionality that provides for a logic flow to the execution sequence. For example, an action can provide a GOTO logic at a certain point in the execution sequence, or can provide for an IF logic such as a branching path at a certain point in the execution sequence, each branch corresponding to a condition being satisfied or not satisfied. The action type execution may have configurable input or parameters, such a sequence number, to direct the logic flow to another execution sequence, execution or action.

In some embodiments, the executions 216 can be associated with an application that may execute the executions as part of an execution sequence (e.g. the WMS application 202). The executions 216 can be associated with a group of executions (e.g. to promote search functionality, such as that described herein). The group may correspond to a function type of the executions, such as a picking executions group, a slotting executions group, or an allocation executions group. The executions may also be assigned to other types of groups. The executions 216 can be associated with a device or input type that is implemented when the execution sequence including the execution is implemented. For example, the executions can be associated with radio frequency (RF) devices that provide for RF inputs, glasses (e.g. that provide a display viewable to a user, such as GOOGLE GLASS or other similar devices), or devices that provide for voice inputs. For example, if an execution specifies that an RF tag be scanned as part of implementing an execution sequence, the execution may be tagged as being an RF execution. The executions 216 can also be tagged as being "execution only" (e.g. can be a stand-alone execution). Some example executions are shown in FIG. 3C and are described in more detail below.

In some embodiments, the actions 216 can include functionality that provides for logic for an execution sequence. Some example actions 216 include, but are not limited to: a "GOTO" action that specifies that the execution sequence proceed to a particular task of the execution sequence, a "TAG" action that serves as a reference point (e.g. and can be specified by a GOTO action), and an "IF" or conditional action that provides branching paths to two or more tasks of the execution sequence (e.g. if one or more first conditions are satisfied, the execution sequence proceeds to a first task, and if the one or more first conditions are not satisfied, the execution sequence proceeds to a second task). By way of example, an IF action may specify that if an error is identified (e.g. if an error flag indicates that an error has occurred), the execution sequence should proceed to an execution that specifies displaying an error message. Other types of actions 216 may also be implemented.

In one or more embodiments, the data structure or objects for execution sequences 220 may store one or more execution sequences. Each execution sequence may include, or may be associated with one or more executions, actions, and paths. Each execution sequence may include, or be associated with a header that includes one or more of the following: last update or activity information (e.g. that indicates a time the execution sequence was last updated and/or a user that last updated the execution sequence), an execution sequence name, an execution sequence type (e.g. picking, slotting, allocation, or any other type of warehouse management process), an execution device on which the complete execution sequence may be implemented (e.g. a tablet, a mobile device, or any device with a scanner), a group (e.g. specifying a particular company or client for whom the execution sequence is available), notes (e.g. programmer notes), and a description of the execution sequence. In some embodiments, at least some of the above-mentioned information is not included in the header of the execution sequence but is associated with the execution sequence.

The smart task engine 222 can execute an execution sequence, such as an execution sequence stored in a database on in memory via a data structure or object of execution sequences 220. For example, a client device (e.g. one of the clients 102) may access the work flow management system 200 and may identify an execution sequence to be executed. The client device may do so via the WMS application 202, or via another application executing on the client device (e.g. a dedicated application for executing an execution sequence, which may or may not provide the functionality described herein for generating or modifying an execution sequence). The smart task engine 222 may execute processes specified by the identified execution sequence, and may provide corresponding resources to the client device that requested execution of the execution sequence. For example, the execution sequence may include an execution of identifying a quantity of a certain product stored at a particular location. The smart task engine may, as part of executing the execution sequence, identify the quantity of the certain product stored at the particular location, and may transmit that information to the client device. The smart task engine 222 may similarly perform any other process specified by the execution sequence. This, the work flow management system 200 can both provide for generating and modifying execution sequences and for executing the execution sequences. In other embodiments, the smart task engine may be omitted.

The execution bean 224 may include a data structure (e.g. a JAVA bean, a library, or an API) that provides for communication between execution sequences of the execution sequences 220. That is, in some implementation, the execution bean 224 may provide for a first execution sequence to reference or call a second execution sequence. For example, the first execution sequence may include, as a task, execution of all or of a portion of the second execution sequence. In some embodiments, the execution bean is a JAVA bean that includes all of the execution sequences 220 as objects.

In some embodiments, the work flow management system 200 is executed on the clients 102, such as on a same client device executing the MWS application 202. In some embodiments, the work flow management system is included in the WMS application 202. In such embodiments, any of the processes described herein can be performed locally on the client device executing the WMS application 202.

Thus configured, in some implementations, the work flow management system 200 can provide for generating, modifying, deleting, copying, and executing one or more execution sequences. With the work flow management system 200, a user can implement a new process from concept within minutes, in the same day, without custom coding to enhance speed, accuracy and predictability with the implementation.

Figure 2B:
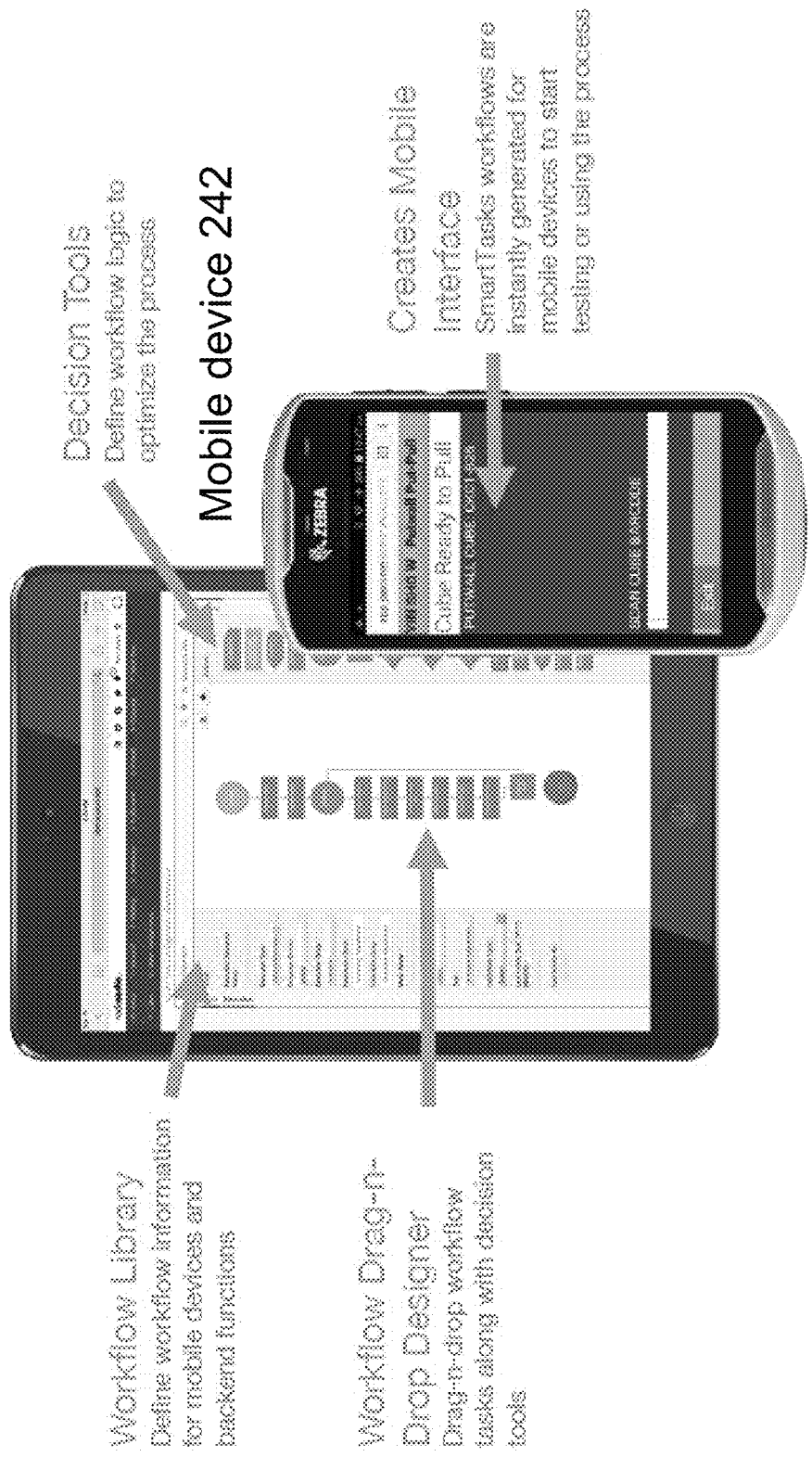
FIG. 2B is a graphical representation of a work flow configurator for a work flow management system.

Referring now to FIG. 2B, FIG. 2B shows an example embodiment a tablet 240 displaying the smart task GUI 204, and a client device (e.g. one of the client devices 106) executing an execution sequence via the smart task engine 222. The smart task GUI 204 depicted in FIG. 2B shows a sequence creation screen for modifying or generating an execution sequence. The depicted smart task GUI 204 provides a workflow library that defines workflow information for mobile devices and backend functions, and further provides a workflow drag-n-drop designer that provides for dragging and dropping tasks and/or inserting decision logic (e.g. via action tasks) to generate or modify the execution sequence. The depicted decision tools can include one or more executions and one or more actions that can be implemented in the execution sequence.

FIG. 2B depicts a mobile device 242 that displays a mobile interface and executes an execution sequence generated by the smart task configurator 206. The mobile device 242 can execute an application (e.g. the WMS application 202 or another application) that communicates with the smart task engine 222 of the work flow management system 200 to execute the execution sequence. For example, the execution sequence may include an execution that specifies displaying an indication to scan a barcode, and the mobile device 242 display such an indication. Upon receiving a scanned barcode, the mobile device 242 may forward the information to the smart task engine 222, which can process the scanned barcode, and the execution sequence may proceed.

The tablet 240 and the mobile device 242 are examples of devices that can be used to readily generate or modify an execution sequence and to readily test or implement the execution sequence. This can provide for a fast, efficient process that can be implemented any a variety of suitable devices, including any devices that can execute the WMS application 202.

Figure 2C:
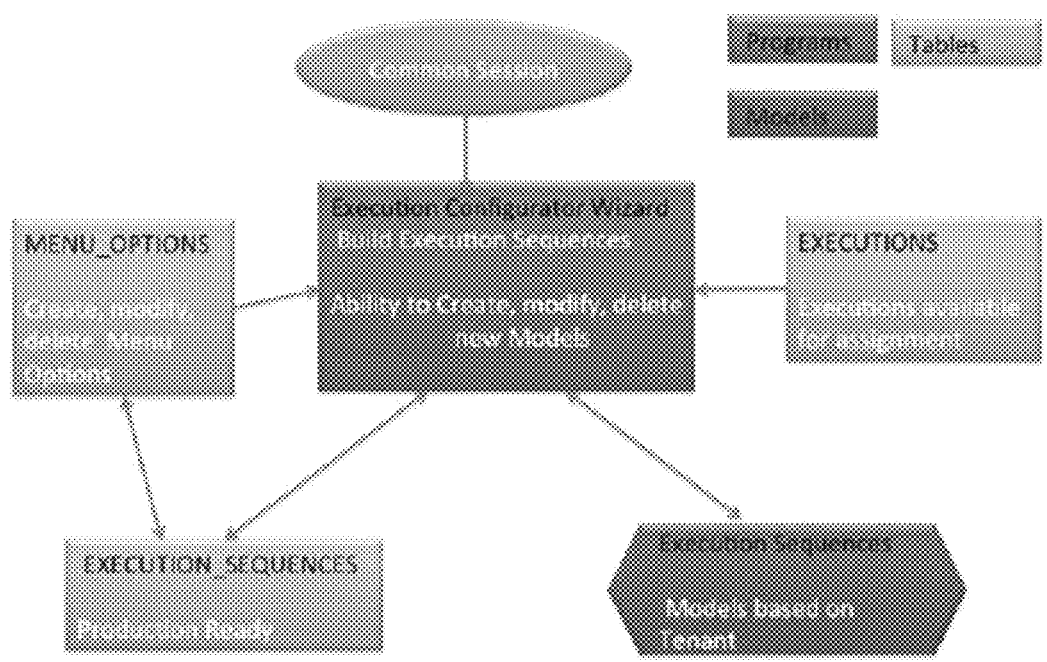
FIG. 2C is a graphical representation of a design of an implementation of a work flow configurator of a work flow management system.

Referring now to FIG. 2C, FIG. 2C shows an overview of some functionalities of the smart task configurator 206. Generally speaking, the smart task configurator 206 can create, modify, or delete execution sequences (e.g. the execution sequences 220 stored by the workflow management system 200). The smart task configurator 206 can implement a common session (e.g. in communication with one or more of the clients 102 executing the WMS application 202) that provides access to the smart task wizard 208 (which may also be referred to as an execution configuration wizard). This may include access to the sequence creation screen described herein. The execution configuration wizard can provide for building to generating execution sequences, and can provide for creating, modifying, and deleting new work flow models (which include execution sequences and associated information, such as the associated information described above).

The smart task wizard 208 may provide for including one or more of the executions 216 in an execution sequence. The smart task wizard 208 may also provide access to previously stored execution sequences, such as by providing access to previously stored models accessible to a user (or "tenant"). The smart task wizard 208 may further provide for creating, modifying, or deleting menu options of models. For example, when executing an execution sequence, a client device may provide menu options to a user (e.g. to change display settings, to pause the execution sequence or skip a step in the execution sequence, or to modify the execution sequence by accessing the smart task wizard 208). The smart task wizard 208 may allow such menu options to be configured. By implementing these functionalities and other functionalities described herein, the smart task wizard 208 can provide for generating or modifying execution sequences that are "production ready" (e.g. ready to be executed or tested). Such execution sequences can be stored in the execution sequences 220 data structure.

Figure 2D:
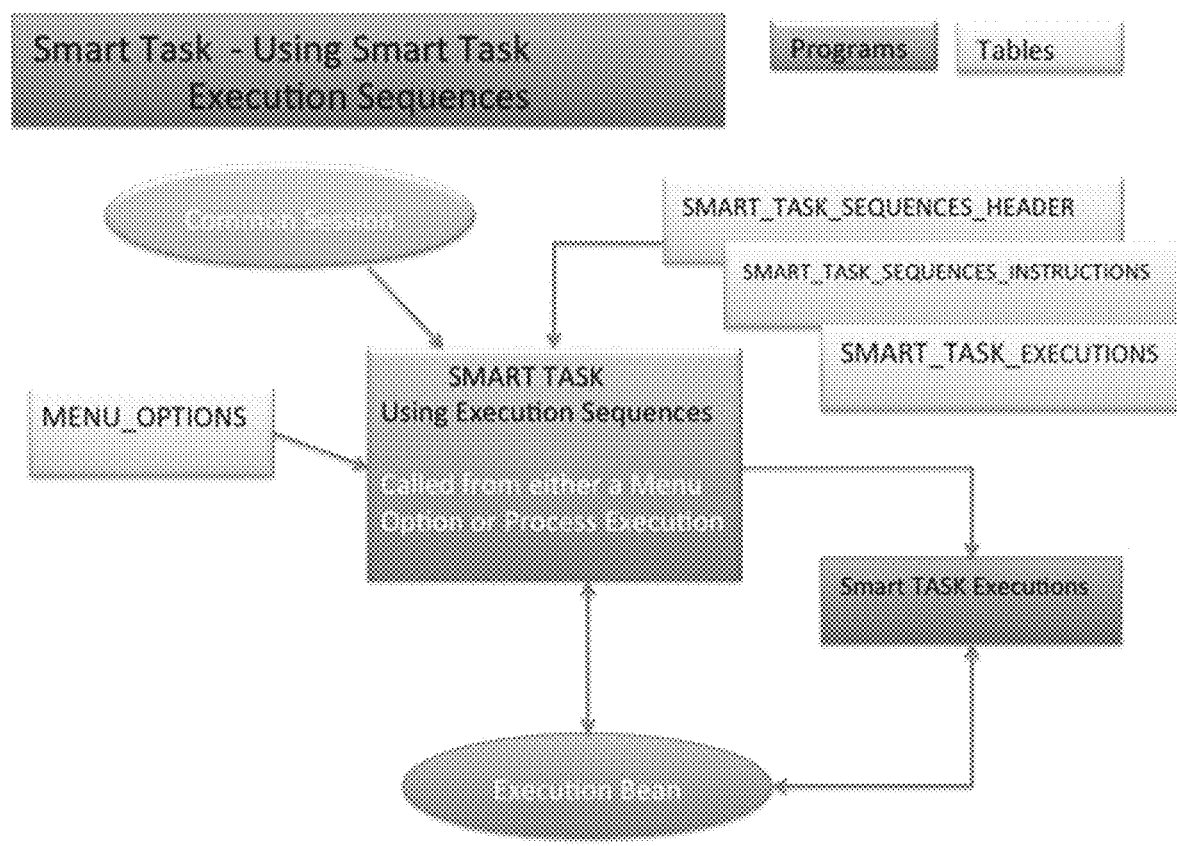
FIG. 2D is a graphical representation of a design of an implementation of a work flow engine of a work flow management system.

Referring now to FIG. 2D, FIG. 2D shows an overview of some functionalities of the smart task engine 222. Generally speaking, the smart task engine 222 can execute one or more execution sequences (e.g. the execution sequences 220 stored by the workflow management system 200). The smart task engine 222 can implement a common session with a client device (e.g. one of the clients 102 executing the WMS application 202 or another application) to execute the execution sequence. The smart task 222 can implement smart task processes using execution sequences, such as one or more of the execution sequences 220. Such execution sequences may call or reference executions, or may call or reference other execution sequences (e.g. using the execution bean 224). The execution by the smart task engine 222 of the execution sequence may be guided by selected menu options. For example, as discussed above in reference to FIG. 2C, the smart task engine 222 may pause execution of the execution sequence or may skip a step based on a user selecting menu options. The smart task engine 222 may implement models that include execution sequence headers and execution sequences including actions (e.g. sequence instructions that specify sequence logic) and executions. The smart task engine 222 may implement programs and may reference tables that correlate execution sequences and associated information in order to perform the above-described functionalities.

Referring now to FIG. 3A, FIG. 3A shows a search screen displayed in the smart task GUI 204. The search screen may provide for searching for previously stored execution sequences, such as the execution sequences 220. A previously stored execution sequence can be accessed to view, modify or copy the execution sequence. The search screen may provide for searching for executions sequences in any appropriate manner, such as by an information associated with the execution sequence (e.g. information included or specified in a header of the execution sequence or elsewhere). For example, search fields can include, but are not limited to: an application associated with the execution sequence, a task included in the execution sequence, an execution group, an execution type, an execution device, an execution sequence name, at least a part of the execution sequence description (e.g. a search for one or more words included in the description), a tenant (e.g. a user profile associated with the execution sequence, such as a creator or a party with certain permissions associated with the execution sequence), or a menu name (e.g. one or more menu options associated with the execution sequence). The search fields may be configured to receive user text inputs, or may provide dropdown menus for selecting search options. The search screen may also include buttons, such as a "display all" button that displays all matching search results, a "search" button that displays search results (e.g. in a preferred or predetermined format), and/or a "new" button that provides for creating a new execution sequence (e.g. that loads a sequence creation screen shown in FIG. 3B).

Referring now to FIG. 3B, FIG. 3B shows a sequence creation screen displayed in the smart task GUI 204. The sequence creation screen can include a drag and drop interface for configuring an execution sequence. For example, the smart task GUI 204 may provide a list of executions and a list of actions (e.g. the executions 216 and the actions 218). Hovering a mouse icon or cursor over the provided executions and actions may provide additional information about the executions and actions. The provided executions and actions may correspond to certain predetermined parameters of the to-be-created execution sequence (e.g. an application type, a device type, etc.) The smart task GUI 204 may provide for dragging a first task (e.g. an execution) on to a particular area of the smart task GUI 204, dragging a second task (e.g. an action) on to the particular area of the smart task GUI 204, and connecting the first task and the second task via a path. The connection via a path may be implemented automatically by the smart task GUI 204, or may be implemented manually by a user. Thus, two tasks can be connected via drag and drop to generate at least a portion of an execution sequence. More tasks can be added to the execution sequence in a similar manner.

An example execution sequence is shown in FIG. 3B. In the depicted sequence creation screen, a set of executions are provided, including a "display location" execution (e.g. with a functionality of displaying a currently selected location), a "scan location" execution (e.g. with a functionality of scanning, or receiving as an input, information indicating a location, such as a location in one or more warehouses), a "scan check digit" execution (e.g. with a functionality of performing a check digit operation to, such as checking a value of characters included in a barcode), a "display quantity" execution (e.g. with a functionality of displaying a quantity of a product, such as a product at a selected location), and a "verify quantity" execution (e.g. with a functionality of confirming or updating the quantity of the product). The executions may be displayed along with associated information, such as a group or type of the executions.

In the depicted sequence creation screen, a set of actions are provided, including a "GOTO" action (e.g. with a functionality of directing the execution sequence to a particular task of the execution sequence), an "IF" exit action (e.g. with a functionality of directing the execution sequence to a particular task of the execution sequence if one or more conditions are satisfied), an "IF" error action (e.g. with a functionality of directing the execution sequence to a particular error-related task, such as a "display error message" execution, if an error condition is satisfied), an "END" execution action (e.g. with a functionality of ending implementation of the execution sequence, and in some embodiments generating logs regarding the implemented execution sequence), a comment line, and a "TAG" action (e.g. with a functionality of serving as a reference point that other tasks may reference).

Although certain example executions and actions are shown in the sequence creation screen of FIG. 3B, any of those example executions and actions may be omitted as appropriate, and/or other executions and actions may be provided. As discussed above, the provided executions and actions can be assembled and connected by paths via a drag and drop method to configure a task process including an execution sequence.

In some embodiments, the sequence creation screen provides for assembling executions and actions into an enumerated list of sequences and/or a flow chart that defines the execution sequence. In some embodiments, the sequence creation screen provides for assembling provided executions and actions into an ordered list of executions and actions. For example, FIG. 3D shows an in-progress creation of an execution sequence in this manner. The smart task GUI 204 may provide a "flow chart" button on the screen shown in FIG. 3D that provides for viewing the ordered list of executions and actions as a flow chart (such as the flow chart shown in FIG. 3B), or provides for changing to a flow chart drag and drop mode of configuring the execution process. The flow chart display in FIG. 3B may also have a button that provides for switching to an "ordered list" mode of configuring the execution sequence.

Referring now to FIG. 3C, FIG. 3C shows some example executions, and shows some information associated with the example executions. Each depicted execution specifies an application that is to execute the execution, a group (e.g. specifying a pick type execution, a slotting type execution, an allocation type execution, or a general execution), a device or input type of the execution, an indication of whether the execution is "execution only" (e.g. can be a stand-alone execution), and a description of the execution. The executions can involve, for example, any of displaying a location, scanning a location (e.g. via a barcode that indicates the location), performing a check digit process, displaying a quantity of a product for a picking process, verifying a quantity of a product, showing a path, location, or product (e.g. via a GUI of a mobile device or using a glasses type device), filling one or more locations, or pulling product form one or more locations. Generally speaking, an execution can have a functionality of any process that can be performed by a client device, including a client device in communication with other devices.

FIG. 3D, as described above, shows an in-progress creation of an execution sequence. Specifically, FIG. 3D shows an example of configuring an execution sequence as an ordered list of executions and actions that may be identified by a corresponding sequence number. The smart task GUI 204 may provide a "flow chart" button on the screen shown in FIG. 3D that provides for viewing the ordered list of executions and actions as a flow chart (such as the flow chart shown in FIG. 3B), or provides for changing to a flow chart drag and drop mode of configuring the execution process.

FIG. 3E shows an example of a "slotting" type execution sequence. The slotting execution sequence is shown as an ordered list of twelve (12) tasks with corresponding sequence numbers. For sake of simplicity of description, one or more tasks may be omitted from the following description and from FIG. 3E. The depicted tasks include the following. (1) A TAG action that serves as a START reference point in the execution sequence. (2) An opportunity execution that has a functionality of determining if a replenishment can be cancelled for reduced for a specified slot. (3) An IF action that leads to exiting the execution sequence if an exit flag is activated, and otherwise leads to a next action. (4) An IF action that leads to the START reference tag if a USED flag is activated, and otherwise leads to a next execution. (5) A FILL execution that determines if an expected replenishment quantity will fit into an existing prime slot. (6) An IF action that uses the determination of the previous execution to determine if a condition is satisfied, wherein if the expected replenishment quantity will fit into the existing prime slot, the process ends, and if not, the process proceeds to a next execution. (7) A FILL execution that determines if an expected replenishment quantity will fit into an existing reserve slot. (8) An IF action that uses the determination of the previous execution to determine if a condition is satisfied, wherein if the expected replenishment quantity will fit into the existing reserve slot, the process ends, and if not, the process proceeds to a next execution. (9) A FIND execution that finds an open existing reserve location. (10) a DISPLAY execution that displays or prints an indication that no reserve location is available. (11) A TAG action that serves as a reference point for an end of the process. (12) An END execution that ends the process (and e.g. includes compiling logs that detail the process).

This slotting execution sequence is presented by way of example, and execution sequences are not limited to the implementation depicted in FIG. 3E.

Figure 4:
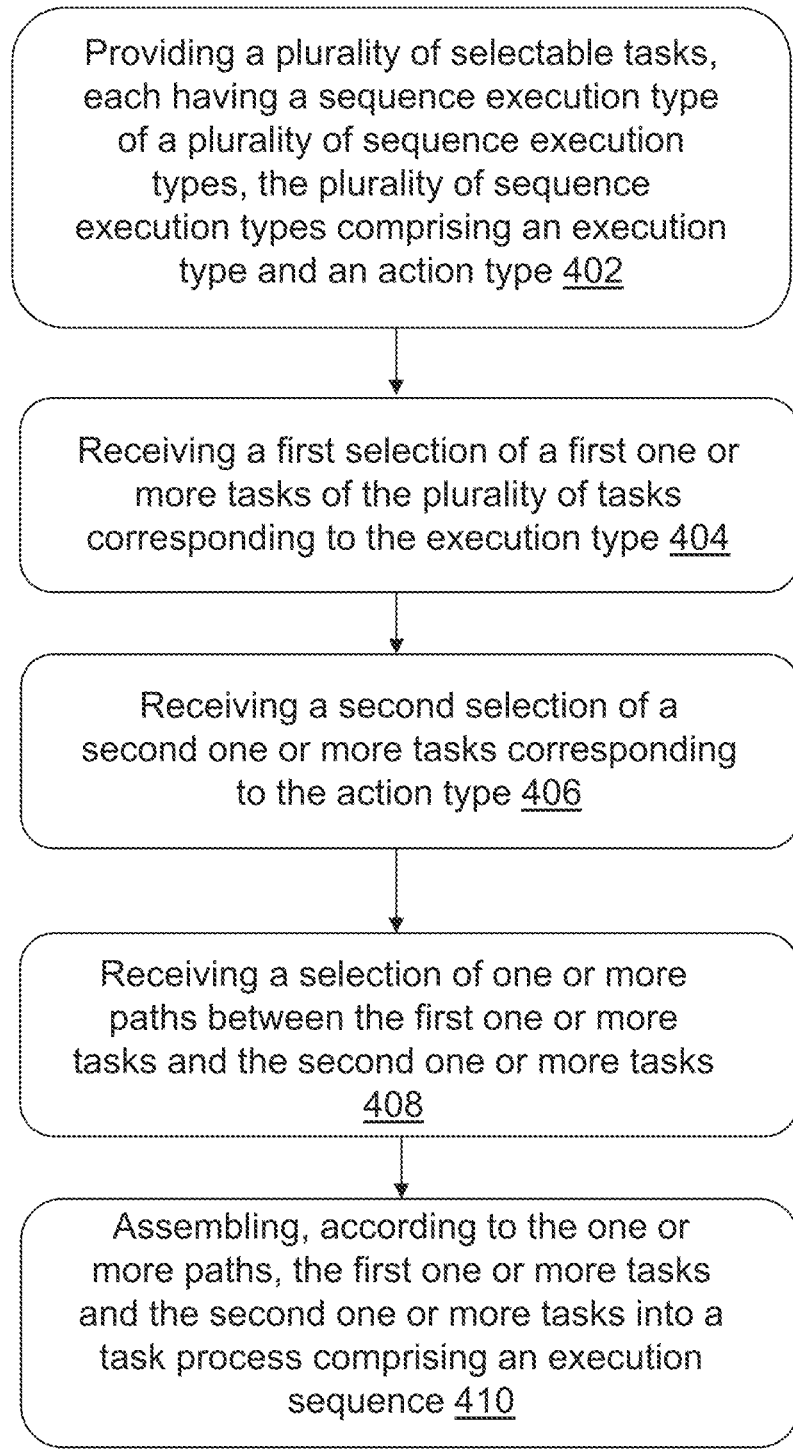
FIG. 4 is a flow diagram of an embodiment of a method for configuring a work flow.

Referring now to FIG. 4, FIG. 4 shows a method for configuring a task process including an execution sequence. The method includes blocks 402 through 410. In a brief overview, the smart task GUI 204 executed by the WMS application 202 can provide a plurality of selectable tasks, each having a sequence execution type of a plurality of sequence execution types, the plurality of sequence execution types including an execution type and an action type (BLOCK 402). The smart task GUI 204 can receive a first selection of a first one or more tasks of the plurality of tasks corresponding to the execution type (BLOCK 404). The smart task GUI 204 can receive a second selection of a second one or more tasks corresponding to the action type (BLOCK 406). The smart task GUI 204 can receive a selection of one or more paths between the first one or more tasks and the second one or more tasks (BLOCK 408). The smart task GUI 204 can assemble, according to the one or more paths, the first one or more tasks and the second one or more tasks into a task process including an execution sequence. (BLOCK 410).

In more detail, at BLOCK 402, the smart task GUI 204 can provide a plurality of selectable tasks, each having a sequence execution type of a plurality of sequence execution types, the plurality of sequence execution types including an execution type and an action type. For example, the smart task GUI 204 can provide one or more executions and one or more actions having predetermined functionalities. This may be provided via a sequence creation screen, such as that shown in FIG. 2B. The sequence creation screen can include a drag and drop interface for configuring an execution sequence. For example, the smart task GUI 204 may provide a list of executions and a list of actions (e.g. the executions 216 and the actions 218) beside an area in which the executions and actions can be dragged. Hovering a mouse icon or cursor over the provided executions and actions may provide additional information about the executions and actions. The provided executions and actions may correspond to certain predetermined parameters of the to-be-created execution sequence (e.g. an application type, a device type, etc.). In some implementations, the sequence creation screen can provide the plurality of executions and actions in an interface that provides for assembling one or more of the provided executions and actions in an ordered list.

At BLOCK 404, the smart task GUI 204 can receive a first selection of a first one or more tasks of the plurality of tasks corresponding to the execution type. For example, the smart task GUI 204 can receive a selection of a first execution of the provided executions to be included in the execution sequence. The smart task GUI 204 receiving the selection can include receiving an indication that the first execution has been dragged into an area for assembling the execution sequence, or by receiving an indication that the first execution is to be added to an ordered list (e.g. by a user selecting the first execution from the list of provided executions and clicking a button to add the first execution to the ordered list).

At BLOCK 406, the smart task GUI 204 can receive a second selection of a second one or more tasks of the plurality of tasks corresponding to the action type. For example, the smart task GUI 204 can receive a selection of a first action of the provided executions to be included in the execution sequence. The smart task GUI 204 receiving the selection can include receiving an indication that the first action has been dragged into an area for assembling the execution sequence, or by receiving an indication that the first action is to be added to an ordered list (e.g. by a user selecting the first execution from the list of provided executions and clicking a button to add the first execution to the ordered list).

At BLOCK 408, the smart task GUI 204 can receive a selection of one or more paths between the first one or more tasks and the second one or more tasks. For example, in the drag and drop interface a path can be added by clicking the first execution and, while holding down the mouse button, moving the mouse to the first action. The smart task GUI 204 may interpret this as a selection of a path between first execution and the first action. A selection of a path can include any indication of a flow between two tasks of the execution sequence being configured. In other embodiments, the paths may be automatically generated by the smart task GUI 204 to connect two or more tasks, and BLOCK 408 can be omitted.

At BLOCK 410, smart task GUI 204 can assemble, according to the one or more paths, the first one or more tasks and the second one or more tasks into a task process including an execution sequence. Assembling the execution sequence can include generating code corresponding to the selections of executions, actions, and paths received in BLOCK 404 through BLOCK 408. The code can be configured to be executed by the smart task engine 222, and can include calls to the execution bean 224 for reference other execution sequences of the execution sequences 220. Assembling the first one or more tasks and the second one or more tasks into a task process including an execution sequence can include the smart task GUI 204 generating the code on a client device executing the WMS application 202, or can include the smart task GUI 204 transmitting information concerning the selections of executions, actions, and paths received in BLOCK 404 through BLOCK 408 to the smart task wizard 208 of the smart task configurator 206, which can generate code executable by the smart task engine 222 using the sequence generator 212.

Any of the blocks of the method of FIG. 4 may be performed in any order and may be performed multiple types with different and/or changing execution types to form a desired execution sequence as an ordered list of any combination of execution types and action types and/or a flow chart providing a graphical representation of the same. Thus the execution sequence can be configured from concept within minutes, in the same day, without custom coding to enhance speed, accuracy and predictability with the implementation. A user using the smart task configurator can configure a combination of predetermined functionality and logic into an ordered list of sequences to perform the desired workflow, such as to perform one or more tasks for a WMS application.

Figure 5:
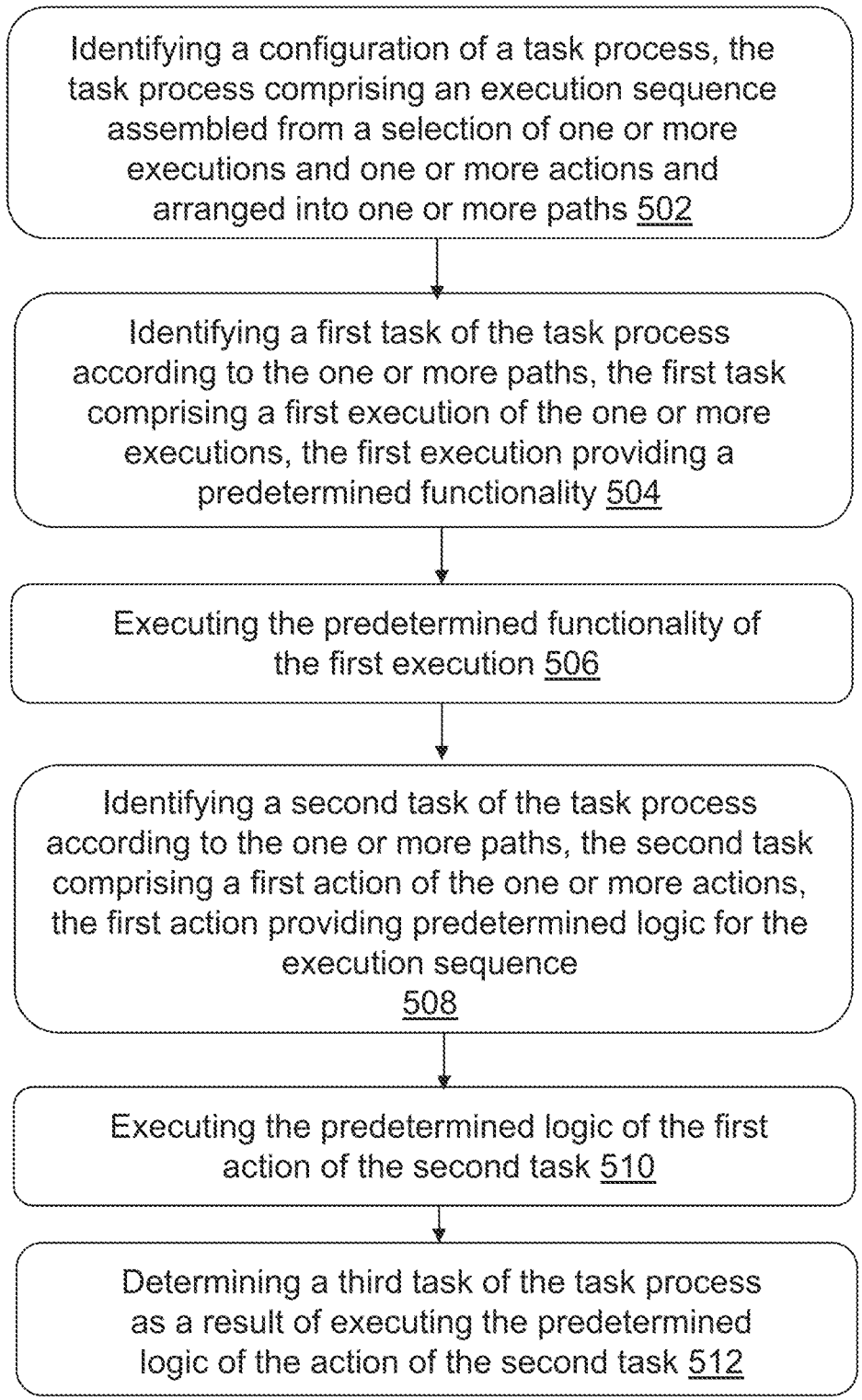
FIG. 5 is a flow diagram of an embodiment of a method for executing a work flow.

Referring now to FIG. 5, FIG. 5 shows a method for executing a task process including an execution sequence. The method includes blocks 502 through 512. In a brief overview, the smart task engine 222 can identify a configuration of a task process, the task process comprising an execution sequence assembled from a selection of one or more executions and one or more actions and arranged into one or more paths (BLOCK 502). The smart task engine 222 can identify a first task of the task process according to the one or more paths, the first task comprising a first execution of the one or more executions, the first execution providing a predetermined functionality (BLOCK 504). The smart task engine 222 can execute the predetermined functionality of the first execution (BLOCK 506). The smart task engine 222 can identify a second task of the task process according to the one or more paths, the second task comprising a first action of the one or more actions, the first action providing predetermined logic for the execution sequence (BLOCK 508). The smart task engine 222 can execute the predetermined logic of the first action of the second task (BLOCK 510). The smart task engine 222 can determine a third task of the task process as a result of executing the predetermined logic of the action of the second task (BLOCK 512).

In more detail, at BLOCK 502, the smart task engine 222 can identify a configuration of a task process, the task process comprising an execution sequence assembled from a selection of one or more executions and one or more actions and arranged into one or more paths. For example, the smart task engine 222 can receive a request from the WMS application 202 or another application to execute a specified execution sequence, such as one of the execution sequences 220. The execution sequences 220 may be stored as executable code generated by the sequence generator 212. The smart task engine 222 can retrieve the specified execution sequence.

At BLOCK 504, the smart task engine 222 can identify a first task of the task process according to the one or more paths, the first task comprising a first execution of the one or more executions, the first execution providing a predetermined functionality. The smart task engine 222 can perform this by executing the code of the specified execution sequence. The code may include a call or reference to a first execution. The smart task engine 222 can execute this code and can retrieve the first execution from the executions 216 stored in the smart task database 214.

At BLOCK 506, the smart task engine 222 can execute the predetermined functionality of the first execution. The predetermined functionality may include any of the functionalities described herein. For example, the predetermined functionality may include a client device scanning a barcode to select a location. The smart task engine 222 may communicate with the WMS application 202 executing on the client device and may instruct the client device to perform a scan function, or may provide a GUI for implementing a scan. The smart task engine 222 may thereby receive scanned information.

At BLOCK 508, the smart task engine 222 can identify a second task of the task process according to the one or more paths, the second task comprising a first action of the one or more actions, the first action providing predetermined logic for the execution sequence. The smart task engine 222 can perform this by executing the code of the specified execution sequence. For example, the first action can be an IF error action. The code can include logic corresponding to the first IF error action by implementing conditional logic to proceed with the execution sequence. In some embodiments, the code may include a call or reference to such logic stored as an action 218 in the smart task database 214.

At BLOCK 510, the smart task engine 222 can execute the predetermined logic of the first action of the second task. By way of example, the first action may specify that if there is an error (e.g. the scanned information is unreadable, in an improper format, or is incorrect), the execution sequence proceeds to a third task (e.g. an execution that displays an error message). The first action may also specify that if there is no error, the execution sequence proceeds to a fourth task (e.g. an execution that displays a quantity of a product available at that location). The smart task engine 222 can determine whether the condition of the first action is satisfied (e.g. whether an error occurred), and can proceed accordingly.

At BLOCK 512, the smart task engine 222 can determine a third task of the task process as a result of executing the predetermined logic of the action of the second task. For example, the error condition described above may be satisfied, and the smart task engine 222 can execute the code of the execution sequence to proceed to a third task that includes an execution that displays an error message. The functionality of the execution of the third task may be performed by the smart task engine in a manner similar to that described above with respect to BLOCK 506.

Thus, an execution sequence can be implemented using predefined functionalities stored as executions 216 and actions 218 that can be assembled into a desired order. This can provide for readily configuring, assembling, and testing or executing execution sequences, which may readily be deployed on various form factors and platforms, without any coding. By using the methods and systems described herein, efficiencies can be realized by, for example, implementing predefined processes that are readily configurable into useful sequences.

C. Waveless WorkFlow Management with Work Order Profiles and Prioritization

Another aspect of the systems and methods of the present solution is directed to learning as the system processes transactions to support smarter decisions from the technology implementation. The system provides decision support to minimize manual decision making and intervention by analyzing work order profiles, priorities and inter-dependencies in real-time. The systems of the present solution removed wave based order flow that most warehouse and fulfillment centers utilize to manager order picking. Wave based workflows divides tasks, such as picking duties, into groups, or waves, centered on common criteria. For example, a wave might include all of the items needed from a particular physical location in the warehouse. Waves might also be based on arrival times for certain freight carriers. Such waved based order flow has peaks and valleys that can lead to inefficiency.

The present solution eliminates waves and prioritizes order in real-time to create a continuous flow. To accomplish this, the systems and methods of the present solution uses work order profiles and prioritization rules to optimize the work flow. The systems and methods of the present solution use statistical measurements of priorities of work order profiles (e.g., average priorities), such as based on analyzing labor hours or unit, and leveraging an average super priority calculation to rank work order profiles in real-time. The systems and methods of this aspect may operate on any of the work flow implementations described in Section B herein.

Figure 6:
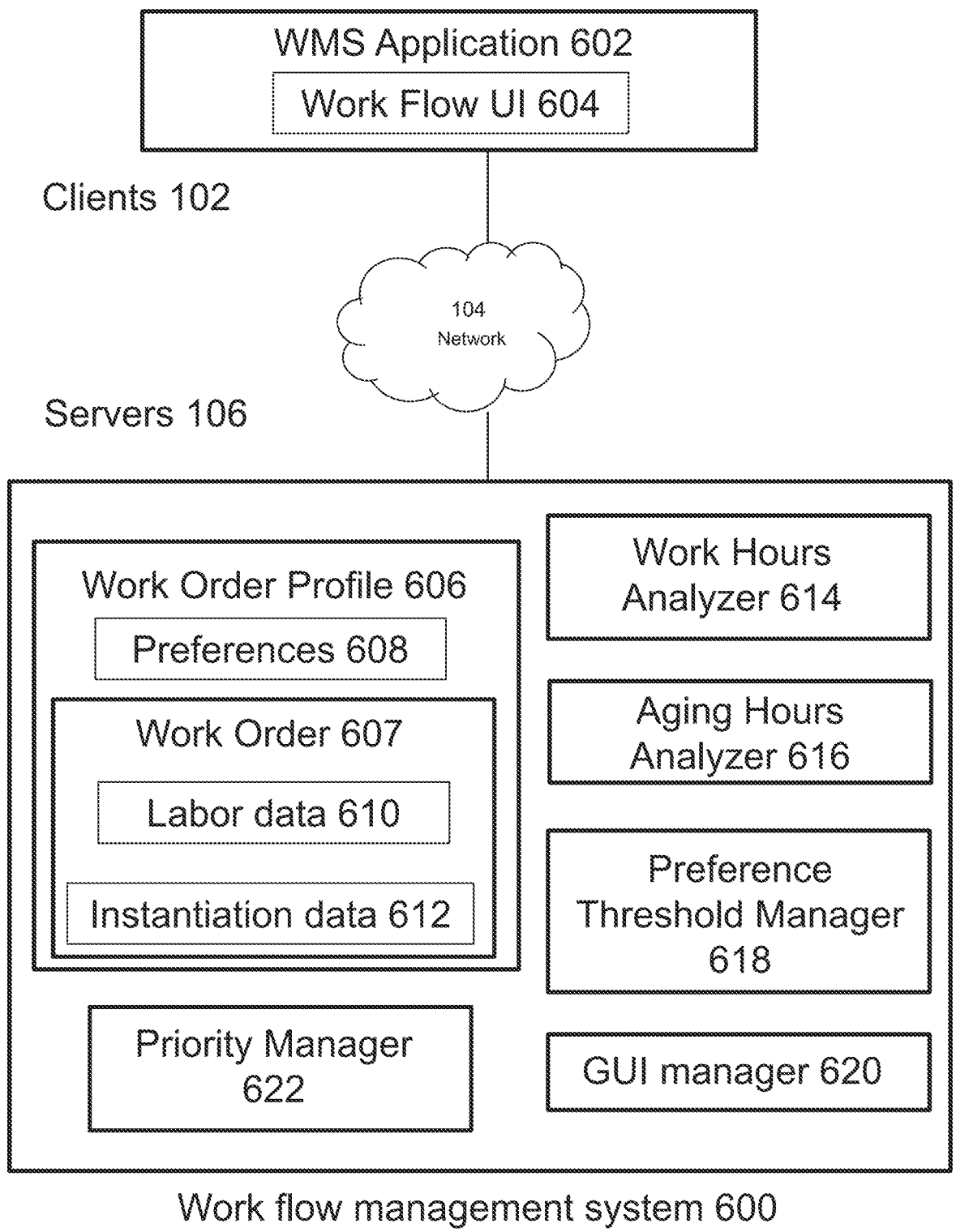
FIG. 6 is a block diagram of embodiments of a work flow management system.

Referring now to FIG. 6, an embodiment of a work flow management system 600 that uses work order profiles and prioritization to provide an implementation of a waveless workflow, or at least partially waveless workflow, is depicted. The work flow management system 600 may be included in a work flow manager. In brief overview, a client 102 comprises a workflow management system (WMS) application 602 that may present or provide a workflow user interface (UI) 604. The client 102 may communicate via one or more networks 104 to servers 106, such as servers that be deployed on a cloud or SaaS platform or otherwise accessible via the Internet. The servers 106 may include a work flow management system 600 that includes one or more work order profiles 606. Each work order profile 606 may include one or more work orders 607. Each work order 607 may include preferences 608, labor data 610 and instantiation data 612. The work flow management system 600 may include a priority manager 622, a work hours analyzer 612, an aging hours analyzer 616 and a preference threshold manager 618, which one or more of, or in combination, can analyze, manage, prioritize, adjust and execute workflows in a more efficient manner. The work flow management system 600 may also include a graphical user interface manager 620 to provide an interface to configure the system and/or access and manage workflows.

In further detail, the WMS application 602 may comprise any type and form of warehouse management applications and/or systems such as embodiments of the WMS application described herein, such as embodiments described in connection with FIG. 2A. The work flow user interface 604 may comprise any type and form of user interface, graphical, command line or otherwise, for interacting, communication with or interfacing to any of the functionality and operations provided by the servers 106. The work flow UI 604 may include any of the embodiments of the user interface described in connection with FIGS. 2A, 3A, 3B, and 3D. The WMS application 602 and/or work flow UI may be constructed, configured or implemented to include, incorporate or implement the work order profile and prioritization aspects and other functionality described herein.

The work flow management system 600 may create, receive, store and/or manage work an order profile 606 for work orders 607 received by, created by, executed by or being managed by the servers 106. The work order profile 606 can include a plurality of work orders 607, and may serve to group the work orders 607 according to one or more characteristics of the work orders 607 (e.g. by client or company, or by work type). In some embodiments, a work order 607 is an electronic record or representation of a work order or portions thereof, such of an amount of work or units of items to provide, make a product or service. In some embodiments, a work order 607 may identify labor or work units for the work order, such as work, line, or quantity. In some embodiments, a work order 607 may be implemented as a work flow or execution sequence as described in Section B. The work order profile 606 may comprise a data structure or object stored in memory, to storage or as tables and/or records to a database. The work order profile 606 may be designed, constructed or implemented to include, reference, specify or identify any one or more attributes, characteristics, meta-data or other data related to a work order 607. The work order profile 606 may identify, specify, reference or include data used by the priority manager 622 to prioritize work orders 607, such as according to a waveless prioritization technique. The work order profile 606 may identify, specify, reference or include preferences 608, labor data 610 and/or instantiation data 612. An example of some data that can be included in work order profiles is shown in Table A of FIG. 10 and is described below.

Preferences 608 may specify or identify any type and form of values to instruct, dictate, or inform how any functionality of the server will operate or behave, such as the priority manager 622, the work hours analyzer 614, or the aging hours analyzer 616. The preferences 608 may be specific to a work order 607, or may correspond to a work order profile 606. Preferences 608 may also specify or identify thresholds or values for identifying or raising an alert or setting an alert status, as illustrated in the table of FIG. 8 and as described below with reference FIG. 8. The preferences 608 may specify or identify one or more times since instantiation (TSI) of the work order at which one or more alert statuses are set for the work order. Non-limiting examples include a preference value for a TSI at which a yellow alert status is set or assigned, another preference value for a TSI at which a red alert status is set or assigned, and another preference value for a TSI at which a blinking alert status is set or assigned. Alerts need not be visual. For example, alert statuses that correspond to one or more audio indicators may be implemented in to the color alter statuses described above. Preferences 608 may specify or identify a value for a refresh rate for updating any user interface or screen or for polling the servers for information. The refresh rate may be specified in any unit of time, such as seconds or minutes. Preferences 608 may also specify or identify a preferred unit value for calculating labor, such as work, lines or quantity. For example, a work order profile may specify values for parameters including a number of work, a number of lines, and a quantity, one or more of which can be used to determine a number of labor hours that corresponds to the work order (e.g. that the work order is estimated to require). The preferences 608 may specify one of these parameters as a preferred parameter to be used by the work hours analyzer 614 when calculating labor hours for the work order profile.

The preference threshold manager 618 may provide any type or form of user interface, graphical or command line, to create, edit, delete and/or manage values for preferences as well as add new preferences to the system (e.g. via the GUI manager 620). The preference threshold manager 618 may store the preferences files in memory via an object or data structure, to storage, as a file, or to a database as one or more records via one or more tables. The preference threshold manager 618 may provide a user interface screen, for example as illustrated in FIG. 8, that presents the above-described table to the user such that the table can be modified and/or maintained. The preference threshold manager 618 may have functionalities as described below.

Labor data 610 may specific or identify data for labor associated with one or more work orders. Labor data 610 may specify values for labor parameters including work, lines or quantities of a work order. Labor data 610 may include any calculations or estimations of labor in any units for a work order such as based on work, lines or quantity or any combination thereof. In some implementations, a work order 607 may include, or may be, an execution sequence that includes one or more executions and/or actions (e.g. as described in section B). The execution sequence may be associated with predetermined labor data, or the executions and/or actions of the execution sequence may be individually associated with respective labor data such that comprehensive labor data can be determined for the execution sequence (e.g. by aggregating or summing the labor data associated with each execution of the execution sequence). The work flow managements system 600 can reference such predetermined labor data 610 and can store such labor data in the work order profile 606 of the work order 607 that includes the execution sequence, or can calculate a comprehensive labor data for the work order profile 606 based on the referenced labor data and store the comprehensive labor data as the labor data 610.

Instantiation data 612 may specify or identify a date and/or time associated with an instantiation of a work order 607. This data may identify the date, day and/or time a work order or work order profile in instantiated either in the system or externally to the system. This data may be used by the aging hours analyzer 616 to calculate a TSI for the work order 607.

The work hours analyzer 614 may comprise functionality, operations and/or logic in the form of executable instructions executable on one or more processors to analyze hours or labor in connection with any work order processing described herein. The work hours analyzer 614 may comprise an application, program, service, script, library, process, task or other forms and types of executable instructions executable on the server. The work hours analyzer 614 may operate in accordance with a work order profile 606 or a work order 607, such as any of the preferences 608 of the work order profile 606 or the work order 607. The work hours analyzer 614 may determine or calculate labor hours for a work order 607 before, during or after processing of a work order 607. The work hours analyzer 614 may calculate labor or work hours for a work order 607 or work order profile 606 when initiated. The work hours analyzer 614 may calculate labor or work hours for a work order 607 or work order profile 606 as being processed or partially fulfilled or before being completed. The work hours analyzer 614 may calculate labor or work hours for a work order 607 or work order profile 606 upon completion or after being processed, fulfilled or completed. The work hours analyzer 614 may continuously or in real-time calculate work or labor hours for a work order 607 or work order profile 606 such as with changing variables in the system or work-flow. Although generally described in terms of work hours, any unit of labor may be used.

By way of example operation, the work hours analyzer 614 may perform any of the following functionality or calculations. The work hours analyzer 614 may select a work order profile 606 that includes a work order 607 being processed, and reference the preferences 608 of the work order profile 606. The work hours analyzer 614 may determine a preferred labor parameter or labor unit specified by the preferences 608. By way of example, the preferred labor parameter can be any of work, lines, or quantity, or can be some other labor parameter. The work hours analyzer 614 may reference the labor data 610 of the work order 607 to determine a parameter value corresponding to the preferred labor parameter. The work hours analyzer 614 may retrieve a "standard" value corresponding to the preferred labor parameter. The standard value can be used to convert the preferred labor parameter value to a labor value (e.g. representing an estimated time to complete a task). The standard value can be, for example, a number of units of the preferred parameter that can be processed in one hour. For example, the standard value can be an estimate of a number of lines, a quantity, or an amount of work that can be processed in one hour. The standard value is a predetermined value. The work hours analyzer 614 may calculate a quantity of labor hours for the work order 607 based on the standard value and the preferred labor parameter value. In one embodiment, the work hours analyzer 614 may divide the preferred labor parameter value by the standard value to generate an estimated number of hours for completing the work order. Thus, the work hours analyzer 614 may calculate a number of labor hours for completing the work order 607.

Aging hours analyzer 616 may comprise functionality, operations and/or logic in the form of executable instructions executable on one or more processors to analyze and identify hours or labor that is aging in connection with any work order processing described herein. The aging hours analyzer 616 may comprise an application, program, service, script, library, process, task or other forms and types of executable instructions executable on the server. The aging hours analyzer may operate in accordance with a work order profile 606 or a work order 607, such as instantiation data 612 of the work order 607. The aging hours analyzer 616 may retrieve the instantiation data 612 of a work order 607 that specifies or identifies a date and/or time associated with an instantiation of the work order 607. This data may identify the date, day and/or time a work order 607 was instantiated either in the system or externally to the system. The aging hours analyzer 616 may compare a date and/or time identified by the instantiation data 612 to a current time (e.g. a current time provided by one of the servers 106) to generate a TSI for the work order 607. The TSI may be an indicator of an urgency of a corresponding work order, and can be used by the priority manager 622 to determine one or more priorities for the corresponding work order.

The preference threshold manager 618 may comprise functionality, operations and/or logic in the form of executable instructions executable on one or more processors to determine, calculate and identify work or labors hours that fall within, beyond or under any thresholds, such as any alert threshold set as preferences (see for example FIG. 8). The preference threshold manager 618 may be configured, constructed or implement to set multiple alert levels or categories of alerts related to work order processing for a work order 607. The preference threshold manager 618 may implement any of these functionalities, and may implement the functionalities described above regarding setting or modifying the preferences 608 of the work order profile 606.

The preference threshold manager 618 can set an alert level for the work order 607 by retrieving alert threshold preferences from the preferences 608 of the work order 607, by comparing the TSI determined by the aging hours analyzer 616 to the alert thresholds specified by the alert threshold preferences, and by determining a corresponding alter status.

By way of example, the alert threshold preferences may include a value for a yellow alert threshold, a value for a red alert threshold, and a value for a blinking alert threshold. The value for the red alert threshold may be greater than the value for the yellow alert threshold, and the value for the blinking alert threshold may be greater than the value for the yellow alert threshold and the value for the red alert threshold. These values may be set as shown in FIG. 8.

The preference threshold manager 618 may compare the TSI to the yellow alert threshold. If the yellow alert threshold is surpassed, the preference threshold manager 618 may set a value of a yellow alert status to "active" (e.g. may set a value indicating the yellow alert status to "1"). Otherwise, the yellow alert status may be set to (or may be left as) "inactive" (e.g. a value indicating the yellow alert may be set to, or left as, "0"). The preference threshold manager 618 may compare the TSI to the red alert threshold. If the red alert threshold is surpassed, the preference threshold manager 618 may set a value of a red alert status to "active" (e.g. may set a value indicating the red alert status to "1"). Otherwise, the red alert status may be set to (or may be left as) "inactive" (e.g. a value indicating the red alert may be set to, or left as, "0"). The preference threshold manager 618 may compare the TSI to the blinking alert threshold. If the blinking alert threshold is surpassed, the preference threshold manager 618 may set a value of a red alert status to "active" (e.g. may set a value indicating the red alert status to "1"). Otherwise, the blinking alert status may be set to (or may be left as) "inactive" (e.g. a value indicating the blinking alert may be set to, or left as, "0").

The preference threshold manager 618 may determine a highest alert status that is "active." In the example described here, the blinking alert is a higher alert status than the red alert and the yellow alert, and the red alert is a high alert status than the yellow alert. This hierarchy may be predetermined, or may be set or determined based on threshold values for the respective alert statuses. The preference threshold manager 618 may set the determined highest alert status as the alert status of the work order corresponding to the work order profile 606. If the preference threshold manager 618 determines that none of the blinking, red, or yellow alert statuses are "active", the preference threshold manager 618 may not set an alert status, or may set a lowest alert status (e.g. a "green" alert status).

Furthermore, the preference threshold manager 618 may maintain a plurality of alert status counts for a plurality of alert levels for a plurality of work orders 607 of a work order profile 606. These alert status counts can be used by the priority manager 622 to determine an average priority, or a super average priority, for a plurality of work order profiles 606, and can allow the priority manager 622 to rank the plurality of work order profiles 606 by priority.

By way of example operation, the preference threshold manager 618 can perform the following operations for each work order 607 of a work order profile 606. The preference threshold manager 618 can compare the TSI of the work order to the alert status thresholds included in the preferences 608 of the work order profile 606. For each alert level, the preference threshold manager 618 can increment a corresponding alert status counter if (i) the TSI is equal to or greater than the corresponding alert level threshold, and (ii) the TSI is below the alert level threshold of the next alert level. For example, if the preferences 608 include respective increasing thresholds for a yellow alert status, a red alert status, and a blinking alert status, and the preference threshold manager 618 determines that the TSI of the work order 607 being processed is above the red alert status threshold (and above the yellow alert status threshold, which is lower than the red alert status threshold) but below the blinking alert status threshold, the preference threshold manager 618 will increment a red status alert counter. If the TSI of the work order 607 is lower than a lowest alert status threshold of the plurality of alert status thresholds, the preference threshold manager 618 can increment a placeholder or "filler" counter (e.g. a green alert status counter).

When displaying or reporting a plurality of work order profiles 606, the GUI manager 620 may cause the work flow UI 604 to display an ordered list of the work order profiles 606 (e.g. as shown in Table B of FIG. 10). The ordered list may include an "aging hours" column that displays, for each work order profile 606, a number that indicates a count of a highest (highest based on the corresponding alert status threshold) non-zero-count alert status for the work order profile 606, and displays an indicator of the alert status. For example, if, of a set of yellow, red, and blinking alert statuses, the respective alert status counts for the work order profile 606 are yellow: 15, red: 0, and blinking: 4, the work flow UI 604 may display the number 4 in the aging hours column for the work order profile 606, and may display that number as blinking. Thus a user may be apprised of a highest non-zero-count alert status for the work orders 607 of the work order profile 606.

By way of example operation, the preference threshold manager 618 can process the alert status counters in order, starting with the highest alert status (e.g. as determined by the alert status thresholds) and proceeding in order to the lowest alert status. Thus, for example, the preference threshold manager 618 can check the count of the highest threshold blink alert status counter. If the count is non-zero, the count may be displayed along with a corresponding alert status indicator in the aging hours column displayed in the work flow UI 604. If the count is zero, the preference threshold manager 618 can check the count of the next-highest threshold red alert status counter. If the count is non-zero, the count may be displayed along with a corresponding alert status indicator in the aging hours column displayed in the work flow UI 604. If the count is zero, the preference threshold manager 618 can check the count of the next-highest threshold yellow alert status counter. If the count is non-zero, the count may be displayed along with a corresponding alert status indicator in the aging hours column displayed in the work flow UI 604. If the count is zero, the preference threshold manager 618 can check the count of the next-highest threshold counter, which may be a lowest (e.g. a filler or green) alert status counter, and can display that count in the aging hours column displayed in the work flow UI 604, with or without an indicator. The refresh rate for any screen or report showing a plurality of work order profiles 606, such as that depicted in table B of FIG. 10, of aging hours may be based on any preference value set in one or more work order profiles. Thus the screen or report can be updated often, or in approximately real time.

The priority manager 622 may comprise functionality, operations and/or logic in the form of executable instructions executable on one or more processors to determine, control, manage, revise prioritization of work order processing described herein, including any changes to the work flow. The priority manager 622 may comprise an application, program, service, script, library, process, task or other forms and types of executable instructions executable on the server. The priority manager 622 may operate in accordance with or responsive to one or more work order profiles. The priority manager 622 may be designed, constructed and implemented to use the work order profiles and prioritization rules to perform, provide or implement a waveless work flow management or work order processing scheme, technique or system. The priority manager 622 may operate responsive to priorities of work orders and a priority slide or setting an adjustable value, referred to as a priority slide value as further described below.

The priority manager 622 may determine a priority for each work order profile 606 or work order 607. The priority manager 622 may determine the priority for a work order profile 606 or work order 607 based on the labor hours or work hours determined by the work hours analyzer 614. The priority manager 622 may determine the priority for a work order profile 606 or work order 607 based on data in the work order profile 606 or the work order 607, such as preferences 608 and/or labor data 610. The priority manager 622 may determine the priority for a work order profile 606 or work order 607 based one or more prioritization policies or rules applied to a work order profile 606 or data thereof. The priority manager 622 may calculate an average priority for a plurality of work order profiles 606 by summing or taking accumulated priority for the work orders 607 of the work order profile 606 and dividing by the sum of work or labor hours for the work orders 607 of the work order profile 606. The priority manager 622 may determine an average, mean or other statistical measurement across a plurality of work orders 607, such as the average priority across multiple work orders 607. The priority manager 622 may determine an average, mean or other statistical measurement based on current work orders 607 of work orders profiles 606 being processed. The priority manager 622 may determine an average, mean or other statistical measurement based on a sampling or subset of current work orders 607 of work order profiles 606 being processed. The priority manager 622 may determine an average, mean or other statistical measurement based on historical priorities of work orders 607 of work order profiles 606 being processed. The priority manager 622 may determine an average, mean or other statistical measurement based on a combination or previous and current work orders 607 of work order profiles 606 being processed.

The priority manager 622 may determine and/or be responsive to a super average priority. In some embodiments, an adjustable value may be set using the work flow UI 604, e.g. via a "priority slide," and can be used as a weight to a priority or to an average priority determined by the priority manager 622. The adjustable value may be referred to as a "priority slide value," but this term can apply to any adjustable value that can be used as a weight to a priority or to an average priority determined by the priority manager 622. The priority slide can be manipulated to identify a value in a range, such as between 1 and 99 or 1 and 100, although any range of values may be used. The value may be specified via any type or form of user interface. The priority manager 622 may set a default value for the adjustable value (e.g. a value in the middle of the value range, such as 50 in a range of 1 to 100). The priority slide can be used to modify the default value and to set a new value. The priority slide value may be specified on a per work order or work order profile basis or for a select set, group of work orders or work order profiles. The priority slide value may be a factor to adjust or be applied to the priority of a work order 607 or to work order profile average priority to prioritize and rank or re-prioritize and re-rank work order profiles 606 or work orders 607. The priority manager 622 may calculate a "super average priority" as a function of or based on average priorities of work order profiles 606 and the adjustable value set via the priority slide. The priority manager 622 may calculate a super average priority by summing up the priority slide values for the work orders 607 or work order profiles 606 and dividing by a sum of work or labor hours. The priority manager 622 may rank work order profiles based on any combination of average priority and super average priority. The priority manager 622 may rank work order profiles 606 based on a function of average priority and super average priority. The priority manager 622 may rank work order profiles 606 based on weighting of average priority and super average priority. The priority manager 622 may enumerate a list of work order profiles 606 based on or responsive to the ranking.

By way of example operation, the priority manager 622 may perform the following processes to calculate a priority, an average priority and an average super priority. The priority manager 622 may determine an individual priority for a work order 607 as an aggregation or sum of the TSI of the work order 607 divided by the labor or work hours for the work order 607. The priority manager 622 may determine, for a work order profile 606, an average priority across a plurality of work orders 607 included in the work order profile 606. The average priority may be determined as an aggregation or sum of the respective TSIs of the work orders 607 divided by an aggregation or sum of the respective labor or work hours for each work order 607 (which may be referenced by the priority manager 622 by retrieving labor data 610 for each of the work orders 607). The average super priority may be determined by applying (e.g. as a weighting factor) respective adjustable values (e.g. as set by a slider) to each TSI of the work orders 607 of the work order profile 606, and aggregating or summing the adjusted respective TSIs of the work orders 607 and divided by an aggregation or sum of the respective labor or work hours for each work order 607 (which may be referenced by the priority manager 622 by retrieving labor data 610 for each of the work orders 607). Thus the average super priority may account for individual adjustable values of the work orders 607.

The GUI Manager 620 may comprise functionality, operations and/or logic in the form of executable instructions executable on one or more processors to provide a user interface to manager any of the operations, configuration and/or functionality of the servers or clients. The priority manager 622 may comprise an application, program, service, script, library, process, task or other forms and types of executable instructions executable on the server. The GUI manager may operate in accordance with or responsive to any of the priority manager 622, work hours analyzer, aging hours analyzer, work order profiles, preference manager, etc. to provide access via user interface to data and functionality associated therewith. The GUI manager 620 may provide resources to the work flow UI 604 for displaying one or more work orders 607, or one or more work order profiles 606. For example, the GUI manager 620 may provide resources to the work flow UI 604 for displaying a plurality of work order profiles 606 as shown in Table B of FIG. 10 in ranked order based on priority (e.g. based on average priority or average super priority, as determined by the priority manager 622), described in more detail below. By way of further example, the GUI manager 620 may provide resources to the work flow UI 604 for displaying a plurality of work orders 607 as shown in Table A of FIG. 10, described in more detail below.

Although in FIG. 6 the GUI manager 620 is depicted as part of the work flow management system 200 on the one or more servers 106, the GUI manager 620 may be executed on the one or more clients 102 (e.g. as part of the WMS application 202), and outputs of the GUI manager 210 (e.g. information for generating execution sequences) may be transmitted to the work flow management system 200 via the network 104. The GUI manager 210 may provide user interface via web pages served to and/or loaded in a browser.

Referring now to FIG. 7, a user interface is depicted for work order profile management of the servers 106, which may be accessed or provided via the GUI manager 620 (e.g. to the work flow UI 604). Via the work order profile management user interface, work order profiles 606 may be created, added, modified and/or deleted. Via such a user interface, the name of work order profile 606, the name of the product and description of product may be included as well as setting, deleting or editing an options for the work order or work order profile. Work orders 607 may be added to, or deleted from, the work order profiles 606 via the depicted interface.

Referring now to FIG. 8, a user interface is depicted for preference entry for work order profiles, which may be accessed or provide via the GUI manager (e.g. to the work flow UI 604). Via this user interface, preference values and conditions may be established for a work order profile 606. For example, a preferred labor unit of work or lines or quantity may be established for calculating labor or work hours. The thresholds for alert statuses by category or alert type may be established as well as the units for a refresh rate for screen or report updates. Any of the preferences may have a default value (e.g. specific to a work order profile 606) that may be adjusted via the depicted interface.

Figure 9:
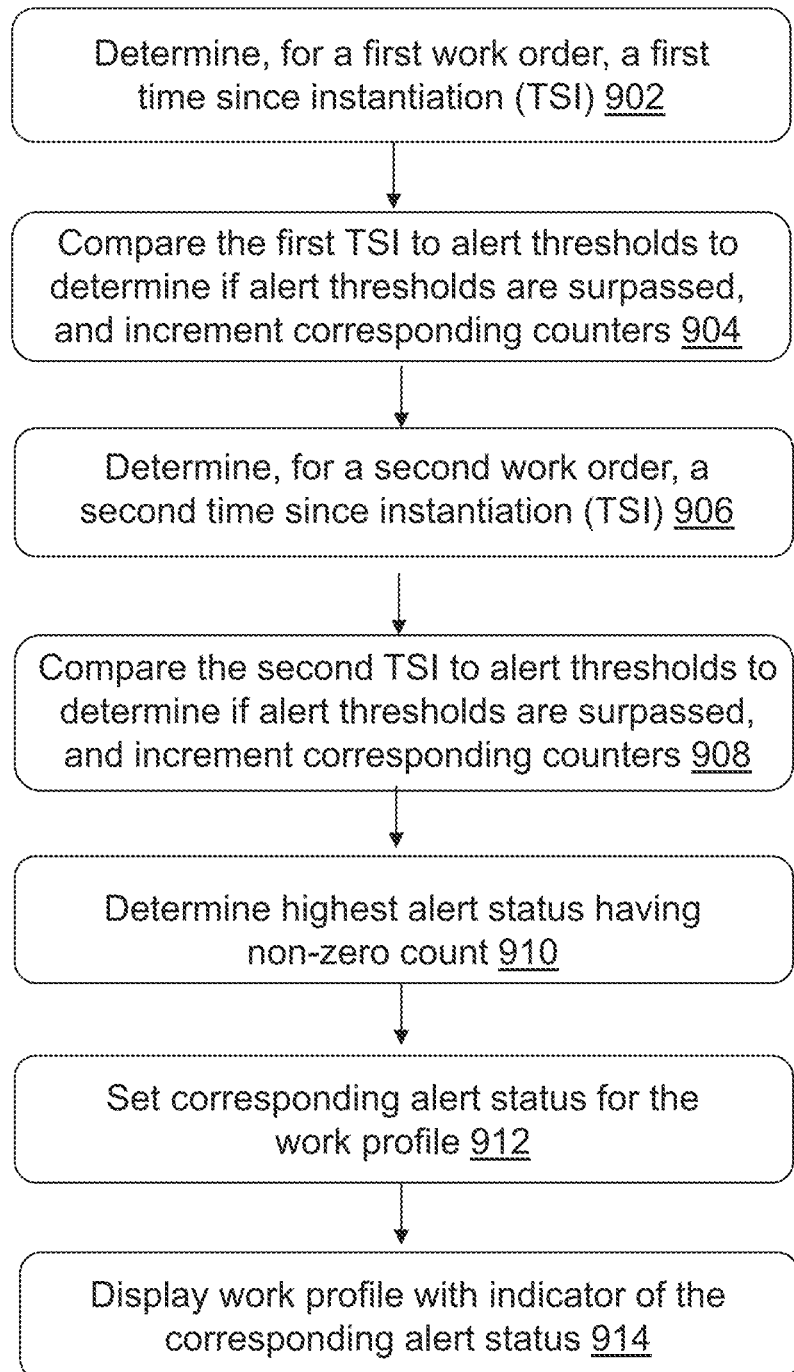
FIG. 9 is a flow diagram of embodiments of a method for work order profile based alerts.

Referring to FIG. 9, a method for managing work order profiles in relation to alerts (such as any of the alerts discussed herein or shown in FIG. 8) is depicted. In brief overview of the method, at BLOCK 902, the system, such as the work flow management system 600 of FIG. 6, determines, for a first work order of a work order profile, a first TSI. The first TSI is compared to alert thresholds at BLOCK 904 to determine if the TSI value surpasses the alert thresholds, and if so, corresponding alert status counters are incremented. At BLOCK 906, the work flow management system 600 of FIG. 6 determines, for a second work order of the work order profile, a second TSI. The second TSI is compared to alert thresholds at BLOCK 908 to determine if the TSI value surpasses the alert thresholds, and if so, corresponding alert status counters are incremented. The processes described in BLOCKs 906 and 908 may be repeated for third or other work orders. At BLOCK 910, the system may determine a highest alert status having a non-zero count. Based on the determinations of BLOCK 910, the workflow management system 600 may set an appropriate alert status for the work order profile at BLOCK 912, and display the alert status with the work order profile at BLOCK 914.

In further detail of BLOCK 902, the system, such as the work flow management system 600 of FIG. 6, determines, for a first work order of a work order profile, a first TSI. The aging hours analyzer 616 may retrieve the instantiation data 612 of the first work order that specifies or identifies a date and/or time associated with an instantiation of the first work order. This data may identify the date, day and/or time the first work order was instantiated either in the system or externally to the system. The aging hours analyzer 616 may compare a date and/or time identified by the instantiation data 612 to a current time (e.g. a current time provided by one of the servers 106) to generate a TSI for the first work order.

In further detail of BLOCK 904, the first TSI is compared to alert thresholds to determine if the TSI value surpasses the alert thresholds, and if so, corresponding alert status counters are incremented. The preference threshold manager 618 can compare the first TSI of the first work order to alert status thresholds included in the preferences 608 of the work order profile being processed. For each alert level, the preference threshold manager 618 can increment a corresponding alert status counter if (i) the first TSI is equal to or greater than the corresponding alert level threshold, and (ii) the first TSI is below the alert level threshold of the next alert level. If the first TSI of the work order is lower than a lowest alert status threshold of the plurality of alert status thresholds, the preference threshold manager 618 can increment a placeholder counter (e.g. a green alert status counter).

In further detail of BLOCK 906, the work flow management system 600 of FIG. 6 determines, for a second work order of the work order profile, a second TSI. The aging hours analyzer 616 may retrieve the instantiation data 612 of the second work order that specifies or identifies a date and/or time associated with an instantiation of the second work order. This data may identify the date, day and/or time the second work order was instantiated either in the system or externally to the system. The aging hours analyzer 616 may compare a date and/or time identified by the instantiation data 612 to a current time (e.g. a current time provided by one of the servers 106) to generate a TSI for the second work order.

In further detail of BLOCK 908, the second TSI is compared to alert thresholds to determine if the TSI value surpasses the alert thresholds, and if so, corresponding alert status counters are incremented. The preference threshold manager 618 can compare the second TSI of the second work order to alert status thresholds included in the preferences 608 of the work order profile being processed. For each alert level, the preference threshold manager 618 can increment a corresponding alert status counter if (i) the second TSI is equal to or greater than the corresponding alert level threshold, and (ii) the second TSI is below the alert level threshold of the next alert level. If the second TSI of the work order is lower than a lowest alert status threshold of the plurality of alert status thresholds, the preference threshold manager 618 can increment a placeholder counter (e.g. a green alert status counter).

The processes described in BLOCKs 906 and 908 may be repeated for third or other work orders. Thus, those processes can be performed for any (or each) of the work orders of a work order profile, and the alert status counters for the work order profile can be incremented accordingly.

In further detail of BLOCK 910 the system may determine a highest alert status having a non-zero count. By way of example operation, the preference threshold manager 618 can process the alert status counters in order, starting with the highest alert status (e.g. as determined by the alert status thresholds) and proceeding in order to the lowest alert status. Thus, for example, the preference threshold manager 618 can check the count of the highest threshold blink alert status counter. If the count is non-zero, the process can end. If the count is zero, the preference threshold manager 618 can check the count of the next-highest threshold red alert status counter. If the count is non-zero, the process can end. If the count is zero, the preference threshold manager 618 can check the count of the next-highest threshold yellow alert status counter. If the count is non-zero, the process can end. If the count is zero, the preference threshold manager 618 can set next-highest threshold, such as a filler (or green) alert status counter as the alert status of the work order profile.

In further detail of BLOCK 912 the work flow management system 200 may display the alert status with the work order profile. The count may be displayed along with a corresponding alert status indicator in the aging hours column displayed in the work flow UI 604 (e.g. as shown in Table B of FIG. 10, and as described in more detail below).

FIG. 10 depicts a Table A and a Table B that can be displayed in the work flow UI 604 and provided by the GUI manager 62 of the workflow system 200. Table A shows work orders 607 of a work order profile 606. Each work order 607 can be displayed along with any of: an identifier or work control number, a work zone (e.g. specifying a location at which the work is to be performed), a status of the work order, one or more personnel or team members associated with the work order (e.g. expected to perform the work order), labor data 610 such as a number of lines or a quantity, an indication as to how many of the lines of quantities are open or remain to be dealt with (which may differ from the labor data, for example, for a work in progress, such as the work control number 66666 shown in Table A), and an aging hours parameter value or TSI of the work order. The Table A may be provided by the GUI manager 620 *t* the work flow UI 604, and the Table A may include a "lookup" button (e.g. for retrieving and displaying more information) and a "force" button (e.g. for forcing the work order to be a next work order to be dealt with or processed, possibly bypassing another priority scheme) for each work order 607.

Table B shows a plurality of example work order profiles. Table B may display the work order profiles arranged according to one or more priorities determined by the priority manager 622. For example, Table B may display the work order profiles arranged according to average priority, or according to average super priority. Each work order profile may be displayed along with an indicator of a total number of work or labor hours for the work order profile (e.g. a summation of the work or labor hours of the work orders of the work order profile, determined by the work hours analyzer 614 in accordance with the preferences 608). Each work order profile may also be displayed along with an indicator of a total number of labor units of the work order profile including lines, quantity, or work. Each work order profile may also be displayed along with an indicator of the average priority and the average super priority of the work order profile.

Each work order profile may also be displayed along with an indicator of a number of aging hours of the work order profile corresponding to the alert status of the work order profile. For example, in Table B the work order profile "Company 1" may have a red alert status, and may, in an aging hours column, display a number of labor hours corresponding to work orders that are above the red alert status threshold. Thus, Table B may display in the aging hours column a number of "red" labor hours of the work order profile. The number of hours may be displayed along with an indication of the alert status (e.g. may be displayed as yellow, red, or blinking). Furthermore, the work flow UI 604 may provide functionality such that if the number of hours displayed along with an indication of the alert status is clicked or otherwise interacted with, corresponding work orders having a number of labor hours corresponding to the indicated alert status may be displayed (e.g. in the format shown in Table A).

The depicted user interfaces shown in Tables A and B show results of applying the prioritization techniques of the system to the work order profiles using priority and super priority calculations described herein, and provide for convenient and efficient viewing and display of relevant or urgent work.

Figure 11:
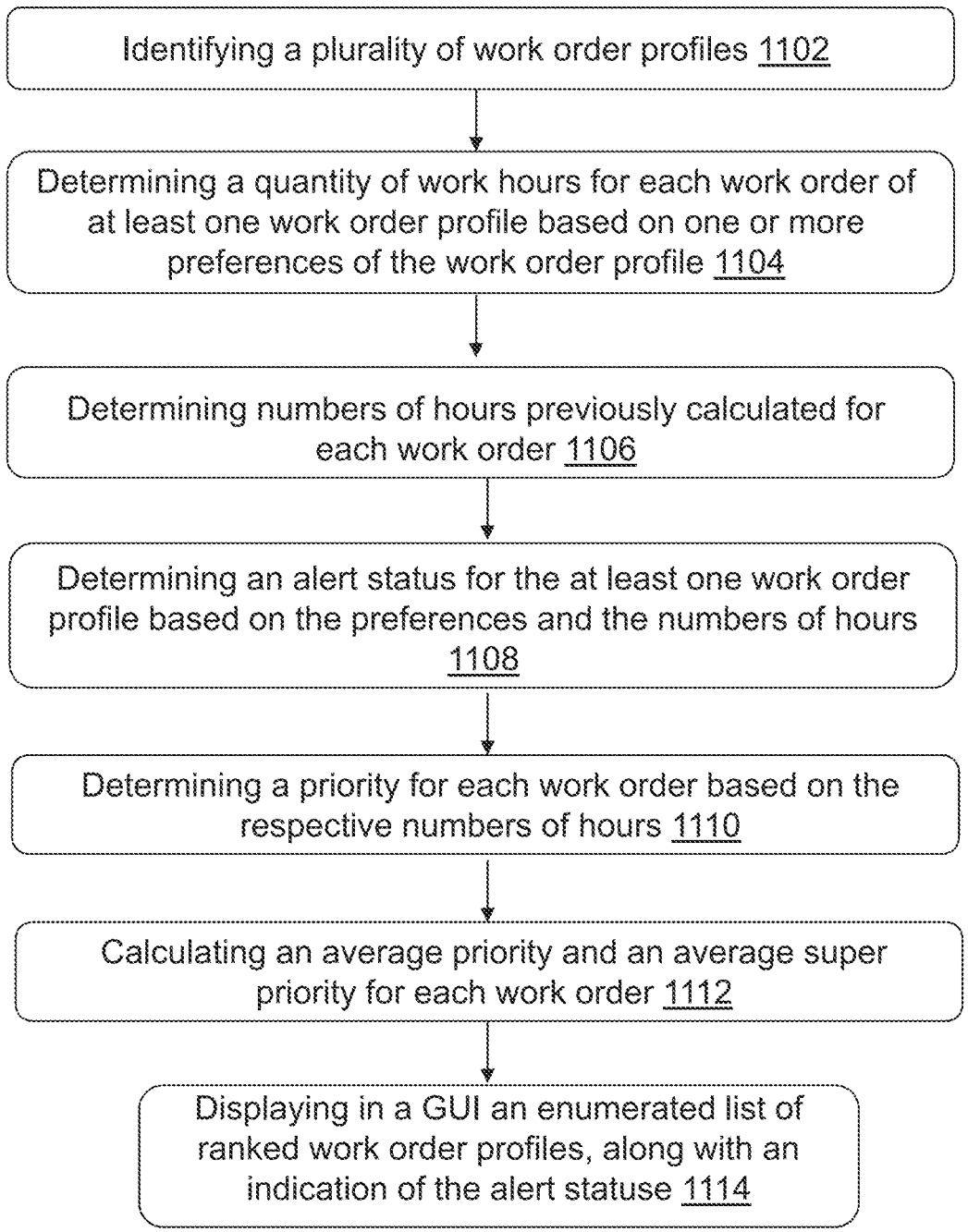
FIG. 11 is a flow diagram of an implementation of prioritization of work orders.

Referring now to FIG. 11, an example implementation of a method of prioritization and ranking work order using the techniques herein is depicted. In brief overview of such a method, at BLOCK 1102, the system, such as the workflow management system 200 of FIG. 6, identifies a plurality of work order profiles each including a plurality of work orders. At BLOCK 1104, the system determines, identifies, obtains or establishes a quantity of work hours for each work order of at least one work order profile based on one or more preferences of the work order profile. At BLOCK 1106, the system determines or calculates numbers of hours previously calculated for each work order, such as TSIs. At BLOCK 1108, the system identifies, determines or calculates an alert status for the at least one work order profile based on the preferences and the numbers of hours. At BLOCK 1110, the system determines a priority for each work order based on the respective numbers of hours. At BLOCK 1112, the system calculates or determines an average priority and an average super priority for each work order. At BLOCK 1114, the system determines or displays or provides for a GUI an enumerated list of ranked work order profiles, along with an indications of the alert status.

In further detail at BLOCK 1102, the system, such as the workflow management system 200 of FIG. 6, identifies a plurality of work order profiles each including a plurality of work orders. The work order profiles may include one or more preferences 608, which can include alert status threshold values and/or a preferred labor unit for calculating labor or work hours. The work orders of the work order profiles can include labor data 610 and instantiation data 612.

In further detail at BLOCK 1104, the system determines, identifies, obtains or establishes a quantity of work hours for each work order of at least one work order profile based on one or more preferences of the work order profile. The system may select at least one of the work order profiles of the plurality of work orders for processing. In some embodiments, the system may perform any of the processes described herein for other, or all, work order profiles of the plurality of work order profiles.

For each work order of the at least one work order profile, the system may determine a quantity of work or labor hours. For example, the work hours analyzer 614 may employ any of the functionality described herein the determine the quantity of work or labor hours. For example, the work hours analyzer 614 may reference the preferences 608 to determine a preferred labor unit, and may determine a number of labor hours based on data concerning the preferred labor unit included in the labor data 610. The work hours analyzer 614 may so determine a quantity of work or labor hours for each work order of the at least one work order profile.

In further detail at BLOCK 1106, the system determines numbers of hours previously calculated for each work order, such as TSIs. The system may implement any of the processes or functionalities described herein for determining a TSI. For example, the aging analyzer 616 may reference the instantiation data 612 of a work order and may determine a TSI for the work order by comparing the instantiation data 612 to a current time. The aging analyzer 616 may so determine a TSI for each work order of the at least one work order profile.

In further detail at BLOCK 1108, the system identifies, determines or calculates an alert status for the at least one work order profile based on the preferences and the numbers of hours. The system may implement any of the processes or functionalities described herein for determining an alert status, such as the method shown in FIG. 9. For example, the preference threshold manager 618 may perform the following operations for each work order of the at least one work order profile 606. The preference threshold manager 618 can compare the TSI of the work order to the alert status thresholds included in the preferences 608 of the work order profile. For each alert level, the preference threshold manager 618 can increment a corresponding alert status counter if (i) the TSI is equal to or greater than the corresponding alert level threshold, and (ii) the TSI is below the alert level threshold of the next alert level. For example, if the preferences 608 include respective increasing thresholds for a yellow alert status, a red alert status, and a blinking alert status, and the preference threshold manager 618 determines that the TSI of the work order being processed is above the red alert status threshold (and above the yellow alert status threshold, which is lower than the red alert status threshold) but below the blinking alert status threshold, the preference threshold manager 618 will increment a red status alert counter. If the TSI of the work order 607 is lower than a lowest alert status threshold of the plurality of alert status thresholds, the preference threshold manager 618 can increment a placeholder counter (e.g. a green alert status counter).

The preference threshold manager 618 may determine for the at least one work order profile an alert status based on the alert status counters. For example, the preference threshold manager 618 may determine a highest alert status having a non-zero count for a corresponding counter, and may set that alert level as the alert level of the at least one work order profile. The alert status" of the work order profile may also refer to an aggregate number of labor hours of work orders that have the same alert status as the at least one work order profile.

In further detail at BLOCK 1110, the system determines a priority for each work order based on the respective numbers of hours. For example, the system can determine a priority for each work order based on the TSI of the work order. In some embodiments, the priority of each work order is an aggregation or sum of the TSI of the work order divided by the labor or work hours for the work order.

In further detail at BLOCK 1112, the system calculates or determines an average priority and an average super priority for each work order. The system may implement any of the processes or functionalities described herein for determining an average priority or an average super priority, including functionalities described herein of the priority manager 622. For example, the priority manager 622 may calculate an average priority for the at least one work order profile as a function based on TSIs, priorities for the work orders, and/or labor or work hours for the work orders. For example, the priority manager 622 may calculate an average priority by summing or taking accumulated priority for the work orders of the at least one work order profile 606 and dividing by the sum of work or labor hours for the work orders of the work order profile 606.

By way of further example, the priority manager 622 may calculate a "super average priority" as a function of or based on average priorities of work order profiles and an adjustable value (e.g. set via a priority slider provided by the GUI manager 620). The priority manager 622 may calculate a super average priority by applying (e.g. as a weighting factor) respective adjustable values (e.g. as set by the priority slider) to each TSI of the work orders of the at least one work order profile, and aggregating or summing the adjusted respective TSIs of the work orders 607 and divided by an aggregation or sum of the respective labor or work hours for each work order 607.

In further detail at BLOCK 1114, the system determines or displays or provides for a GUI an enumerated list of ranked work order profiles, along with an indication of the alert status for the at least one work order profile. The work order profiles may be ranked and enumerated in an order according to the ranking. The worker order profiled may be ranked based on average priority, super average priority or a combination of average priority and super average priority. The system may implement any of the processes or functionalities described herein for determining an average priority or an average super priority, including functionalities described herein of the GUI manager 620. For example, a display or report similar to that shown in Table B of FIG. 10 may be provided. The display or report shows a plurality work order profiles arranged according to one or more priorities determined by the priority manager 622. For example, display or report may display the work order profiles arranged according to average priority, or according to average super priority. Each work order profile may be displayed along with an indicator of a total number of work or labor hours for the work order profile (e.g. a summation of the work or labor hours of the work orders of the work order profile, determined by the work hours analyzer 614 in accordance with the preferences 608). Each work order profile may also be displayed along with an indicator of a total number of labor units of the work order profile including lines, quantity, or work. Each work order profile may also be displayed along with an indicator of the average priority and the average super priority of the work order profile.

Each work order profile may also be displayed along with an indicator of a number of aging hours of the work order profile corresponding to the alert status of the work order profile. For example, the at least one work order profile may have a red alert status, and the display or report may, in an aging hours column, display a number of labor hours corresponding to work orders that are above the red alert status threshold. Thus, display or report may display in the aging hours column a number of "red" labor hours of the at least one work order profile. The number of hours may be displayed along with an indication of the alert status (e.g. may be displayed as yellow, red, or blinking). Furthermore, the work flow UI 604 may provide functionality such that if the number of hours displayed along with an indication of the alert status is clicked or otherwise interacted with, corresponding work orders having a number of labor hours corresponding to the indicated alert status may be displayed (e.g. in the format shown in Table A of FIG. 10).

Thus, by applying the prioritization techniques of the system to the work order profiles using priority and super priority calculations described herein, convenient and efficient viewing and display of relevant or urgent work can be provided for.

Although the systems, methods and techniques described in Section B and C may be described generally in context of a warehouse management system, these systems, methods and techniques can be performed in any domain or context, such as by way of non-limiting examples manufacturing or healthcare.

What is claimed is:

1. A method for configuring a task process of a work flow engine, the method comprising:
   (a) providing, via a user interface of a task configurator, a plurality of tasks selectable via the user interface, each of the plurality of tasks having a sequence execution type of a plurality of sequence execution types, the plurality of sequence execution types comprising an execution type and an action type;
   (b) receiving, via the user interface of the task configurator, a first selection of a first one or more tasks of the plurality of tasks corresponding to the execution type;
   (c) receiving, via the user interface of the task configurator, a second selection of a second one or more tasks corresponding to the action type;
   (d) receiving, via the user interface of the task configurator, a selection of one or more paths between the first one or more tasks and the second one or more tasks;
   (e) assembling, by the task configurator according to the one or more paths, the first one or more tasks and the second one or more tasks into a task process comprising generating an enumerated list of tasks of an execution sequence of the first one or more tasks and the second one or more tasks, each of the first one or more tasks and the second one or more tasks of the execution sequence identified by a unique sequence number; and
   (f) displaying, via the user interface of the task configurator, the assembled one or more tasks in a drag and drop interface for configuring the execution sequence.

2. The method of claim 1, wherein the first one or more tasks corresponding to the execution type of the plurality of sequence execution type identifies an execution providing a predetermined functionality.

3. The method of claim 1, wherein the second one or more tasks corresponding to the action type of the plurality of sequence execution type identifies an instruction to be executed in the execution sequence to provide logic to the execution sequence.

4. The method of claim 1, wherein at least one of the tasks of the task process references an execution bean for communication between execution sequences.

5. A system for configuring a task process of a work flow engine, the system comprising:
   a processor, coupled to memory; and
   a task configurator executable on the processor and configured to:
   provide, via a user interface, a plurality of tasks selectable via the user interface, each of the plurality of tasks having a sequence execution type of a plurality of sequence execution types, the plurality of sequence execution types comprising an execution type and an action type;
   receive, via the user interface, a first selection of a first one or more tasks of the plurality of tasks corresponding to the execution type;

receive, via the user interface, a second selection of a second one or more tasks corresponding to the action type;

receive, via the user interface, a selection of one or more paths between the first one or more tasks and the second one or more tasks;

assemble, according to the one or more paths, the first one or more tasks and the second one or more tasks into a task process comprising generating an enumerated list of tasks of an execution sequence of the first one or more tasks and the second one or more tasks, each of the first one or more tasks and the second one or more tasks of the execution sequence identified by a unique sequence number; and display, via the user interface, the assembled one or more tasks in a drag and drop interface for configuring the execution sequence.

6. The system of claim 5, wherein the first one or more tasks corresponding to the execution type of the plurality of sequence execution type identifies an execution providing a predetermined functionality.

7. The system of claim 5, wherein the second one or more tasks corresponding to the action type of the plurality of sequence execution type identifies an instruction to be executed in the execution sequence to provide logic to the execution sequence.

8. The system of claim 5, wherein at least one of the tasks of the task process references an execution bean for communication between execution sequences.

9. A method of executing a task process configured for a work flow engine, the method comprising:
(a) identifying, by a work flow engine, a configuration of a task process, the task process comprising an execution sequence assembled from a selection of one or more executions and one or more actions and arranged into one or more paths, the execution sequence comprising a generated enumerated list of tasks, each of the tasks of the execution sequence identified by a unique sequence number;
(b) identifying, by the work flow engine, a first task of the task process according to the one or more paths, the first task comprising a first execution of the one or more executions, the first execution providing a predetermined functionality;
(c) executing, by the work flow engine, the predetermined functionality of the first execution;
(d) identifying, by the work flow engine, a second task of the task process according to the one or more paths, the second task comprising a first action of the one or more actions, the first action providing predetermined logic for the execution sequence;
(e) executing, by the work flow engine, the predetermined logic of the first action of the second task; and
(f) determining, by the work flow engine, a third task of the task process as a result of executing the predetermined logic of the action of the second task.

10. The method of claim 9, wherein the predetermined functionality of the third task of the task process comprises a second action of the one or more actions, the second action being a GOTO action that comprises directing the task process to a fourth task of the task process.

11. The method of claim 9, wherein the predetermined functionality of the first action further comprises displaying an error message.

12. The method of claim 9, wherein the predetermined functionality of the first execution comprises displaying a message requesting that information be input to the work flow engine and receiving the information.

13. The method of claim 12, wherein the predetermined logic for the execution sequence provided by the first action comprises determining if the received information is valid, and determining the third task accordingly.

14. A system for executing a task process configured for a work flow engine, the system comprising:
a processor coupled to memory; and
a work flow engine executable by the processor and configured to:
identify a configuration of a task process, the task process comprising an execution sequence assembled from a selection of one or more executions and one or more actions and arranged into one or more paths, the execution sequence comprising a generated enumerated list of tasks, each of the tasks of the execution sequence identified by a unique sequence number;
identify a first task of the task process according to the one or more paths, the first task comprising a first execution of the one or more executions, the first execution providing a predetermined functionality;
execute the predetermined functionality of the first execution;
identify a second task of the task process according to the one or more paths, the second task comprising a first action of the one or more actions, the first action providing predetermined logic for the execution sequence;
execute the predetermined logic of the first action of the second task; and
determine a third task of the task process as a result of executing the predetermined logic of the action of the second task.

15. The system of claim 14, wherein the third task of the task process comprises a second action of the one or more actions, the second action being a GOTO action, the predetermined functionality of the second action comprising directing the task process to a fourth task of the task process.

16. The system of claim 14, wherein the predetermined functionality of the first action further comprises displaying an error message.

17. The system of claim 14, wherein the predetermined functionality of the first execution comprises displaying a message requesting that information be input to the work flow engine and receiving the information.

18. The system of claim 17, wherein the predetermined logic for the execution sequence provided by the first action comprises determining if the received information is valid, and determining the third task accordingly.

* * * * *